US012408670B2

(12) United States Patent
Machado et al.

(10) Patent No.: US 12,408,670 B2
(45) Date of Patent: Sep. 9, 2025

(54) OIL LIQUID FUNGICIDAL COMPOSITIONS

(71) Applicant: Adama Makhteshim Ltd., Beer Sheva (IL)

(72) Inventors: Silvio Luiz Machado, Londrina (BR); Luiz Fernando Colla, Londrina (BR)

(73) Assignee: ADAMA MAKHTESHIM LTD., Beer Sheva (IL)

( * ) Notice: Subject to any disclaimer, the term of this patent is extended or adjusted under 35 U.S.C. 154(b) by 829 days.

(21) Appl. No.: 17/640,697

(22) PCT Filed: Sep. 4, 2020

(86) PCT No.: PCT/IB2020/058268

§ 371 (c)(1),
(2) Date: Mar. 4, 2022

(87) PCT Pub. No.: WO2021/044371

PCT Pub. Date: Mar. 11, 2021

(65) Prior Publication Data

US 2022/0369642 A1 Nov. 24, 2022

Related U.S. Application Data

(60) Provisional application No. 62/895,602, filed on Sep. 4, 2019.

(51) Int. Cl.

| | |
|---|---|
| ***A01N 25/30*** | (2006.01) |
| ***A01N 25/02*** | (2006.01) |
| ***A01N 43/56*** | (2006.01) |
| ***A01N 43/653*** | (2006.01) |
| ***A01N 47/14*** | (2006.01) |
| ***A01P 3/00*** | (2006.01) |

(52) U.S. Cl.

CPC ............. *A01N 47/14* (2013.01); *A01N 25/02* (2013.01); *A01N 25/30* (2013.01); *A01N 43/56* (2013.01); *A01N 43/653* (2013.01); *A01P 3/00* (2021.08)

(58) Field of Classification Search

CPC ........ A01N 47/14; A01N 25/02; A01N 25/30; A01N 43/56; A01N 43/653; A01P 3/00

USPC .......................................................... 514/384

See application file for complete search history.

(56) References Cited

U.S. PATENT DOCUMENTS

| | | | |
|---|---|---|---|
| 8,153,819 B2 | 4/2012 | Dietz et al. | |
| 10,362,782 B2 | 7/2019 | Oliveira et al. | |
| 2009/0131462 A1 | 5/2009 | Gewehr | |
| 2010/0292079 A1 | 11/2010 | Fowler | |
| 2019/0150430 A1 | 5/2019 | Machado | |

FOREIGN PATENT DOCUMENTS

| | | |
|---|---|---|
| AU | 2006201613 A1 | 11/2007 |
| CN | 103907621 A | 7/2014 |
| CN | 103929962 A | 7/2014 |
| CN | 104585181 A | 5/2015 |
| CN | 107105654 A | 8/2017 |
| CN | 107258803 A | 10/2017 |
| EP | 0435760 A1 | 7/1991 |
| EP | 0697171 A1 | 2/1996 |
| FR | 2005958 A1 | 12/1969 |
| WO | WO 2012/016972 A2 | 2/2012 |
| WO | WO 2015/079334 A1 | 6/2015 |
| WO | WO 2017/203527 A1 | 11/2017 |
| WO | WO 2018/083577 A1 | 5/2018 |
| WO | WO 2021/044371 | 3/2021 |

OTHER PUBLICATIONS

International Preliminary Report on Patentability, including Written Opinion of the International Searching Authority, issued Mar. 8, 2022 in connection with PCT International Application No. PCT/IB2020/058268.

International Search Report issued Nov. 26, 2020 in connection with PCT International Application No. PCT/IB2020/058268.

Notification of Transmittal of the International Search Report and the Written Opinion of the International Searching Authority, or the Declaration issued Nov. 26, 2020 in connection with PCT International Application No. PCT/IB2020/058268.

Written Opinion of the International Searching Authority issued Nov. 26, 2020 in connection with PCT International Application No. PCT/IB2020/058268.

*Primary Examiner* — Kristin A Vajda

(74) *Attorney, Agent, or Firm* — Gary J. Gershik

(57) ABSTRACT

The subject invention provides a fungicidal oil liquid compositions comprising: (i) at least one dithiocarbamate fungicide, (ii) at least one triazole fungicide, (iii) at least one pyrazole-carboxamide fungicide, and (iv) at least one agrochemically acceptable non-aqueous liquid carrier, wherein the dithiocarbamate fungicide is suspended in the liquid carrier and the triazole fungicide and the pyrazole-carboxamide fungicide are dissolved in the liquid carrier. The subject invention also provides methods of use and processes of preparation of the compositions described herein.

15 Claims, 3 Drawing Sheets

OIL LIQUID FUNGICIDAL COMPOSITIONS

CROSS-REFERENCE TO RELATED APPLICATIONS

This application is a § 371 national stage of PCT International Application No. PCT/IB2020/058268, filed Sep. 4, 2020, claiming the benefit of U. S. Provisional Application No. 62/895, 602, filed Sep. 4, 2019, the entire contents of each of which are hereby incorporated by reference into the subject application.

Throughout this application various publications are referenced. The disclosures of these documents in their entireties are hereby incorporated by reference into this application in order to more fully describe the state of the art to which this invention pertains.

FIELD OF THE INVENTION

The subject invention provides a fungicidal oil liquid compositions comprising: (i) at least one dithiocarbamate fungicide, (ii) at least one triazole fungicide, (iii) at least one pyrazole-carboxamide fungicide, and (iv) at least one agrochemically acceptable non-aqueous liquid carrier, wherein the dithiocarbamate fungicide is suspended in the liquid carrier and the triazole fungicide and the pyrazole-carboxamide fungicide are dissolved in the liquid carrier. The subject invention also provides methods of use and processes of preparation of the compositions described herein.

BACKGROUND

Dithiocarbamates are generally known to have effective fungicidal activity. However, a particular problem of these active ingredients is their relatively high instability. This is caused by the low stability of the C—S bonds and of the thiocarbamate function, in particular at low pH values and in the presence of nucleophilic agents.

These active ingredients may be formulated as solid formulations in order to improve their stability. Solid powder formulations which are known are, for example, Manzate® 75 WG (product of DuPont), Polyram® DF (product of Nufarm) and Vondozeb 75 WG (product of Agrosimex). However, there are known disadvantages with solid formulations such as water dispersible granules. Some of these may include poor dispersion in water, difficulties in measuring dosages, compatibility with other components in tank mix and the high cost to manufacture such formulations.

In many cases, liquid products are preferred nowadays to the abovementioned solid formulations. The liquid products have the advantage that they show good miscibility, even under ULV (ultra-low volume) conditions, with oil-based tank-mix additives, in a water/oil formulations or oil formulations (see EP0435760 and EP0697171).

Agrochemical oil dispersions (OD) are stable suspensions of agrochemical active ingredients, such as pesticides and crop protection chemicals, in non-aqueous fluids, which may contain other dissolved active ingredients. Oil dispersions are particularly useful for formulating oil insoluble solid active ingredients.

Oil dispersion formulations are a concentrate which is diluted with water before use to produce an aqueous composition which is used in crop protection. In order to enable dispersion in water, such formulations contain emulsifiers, dispersants and further formulation components such as thickeners, antifoaming agents and solid carriers. Oil dispersions are often chosen if the active ingredient is sensitive to water or if the oil is required to act as an adjuvant in order to improve biological performance of the pesticide. Oil dispersions are usually free of water. This is either to prevent degradation of active ingredients and to prevent phase separation of the formulation.

Oil dispersion formulations provide certain advantages to the farmer. Active ingredients which are usually unstable in water may now be formulated in solid suspended form. Oil-based adjuvants may also be combined with these types of formulations in order to enhance efficacy. Further, suspension of active ingredients in non-aqueous liquid carrier can possibly lead to higher active ingredient strength formulations than would otherwise be possible. This is because active ingredients have a solubility limit on the amount that can be added into a formulation.

However, oil dispersion formulations are difficult to formulate. Oil dispersion formulations frequently show phase separation after storage. Thus, storage even at ambient temperatures leads to aggregation effects, lump formation or pronounced settling of the suspended phase. Depending on the density of the active ingredient and of the non-aqueous liquid carrier used, it is also possible for the active ingredient particles to separate from the non-aqueous liquid carrier. In some cases, the effects are irreversible.

Need for new agrochemical compositions with high performance has been increasing, while the number of chemicals approved for use in agrochemical compositions by regulatory authorities has been decreasing due to more rigid standards for the toxicological and ecological properties of these materials. As such, there is a need in the art for a fungicidal composition which allows reduced application rates of individual active ingredients while concurrently maintaining an increased efficacy of the active ingredients. Further, the combination of a multi-site fungicide (such as a dithiocarbamate fungicide) with two systemic fungicides (such as a triazole fungicide and a pyrazole-carboxamide fungicide) in a stable formulation provides a solution which reduces resistance of the diseases, reduces application rates of the active ingredients, improves yield and reduces costs.

Based on the aspects discussed above, there is a need in the art for a stable oil liquid formulation which will include a combination of a multi-site fungicide (such as a dithiocarbamate fungicide) with two systemic fungicides.

SUMMARY OF THE INVENTION

The present invention provides a fungicidal oil liquid composition comprising:

(i) at least one dithiocarbamate fungicide,
(ii) at least one triazole fungicide,
(iii) at least one pyrazole-carboxamide fungicide, and
(iv) at least one agrochemically acceptable non-aqueous liquid carrier, wherein the dithiocarbamate fungicide is suspended in the liquid carrier and the triazole fungicide and the pyrazole-carboxamide fungicide are dissolved in the liquid carrier.

The present invention also provides a combination comprising:

(i) an amount of at least one dithiocarbamate fungicide,
(ii) an amount of at least one triazole fungicide, and
(iii) an amount of at least one pyrazole-carboxamide fungicide, wherein the combination is more effective in treating a plant or a locus against fungal infection than when each fungicide at the same amount is applied alone.

The present invention also provides a combination comprising:

(i) an amount of at least one dithiocarbamate fungicide, (ii) an amount of at least one triazole fungicide, and (iii) an amount of at least one pyrazole-carboxamide fungicide, wherein the amount of the dithiocarbamate fungicide, the amount of the triazole fungicide and the amount of the pyrazole-carboxamide fungicide when applied together is more effective in treating a plant or a locus against fungal infection than when each fungicide at the same amount is applied alone.

The present invention also provides a combination comprising:

(i) an amount of at least one dithiocarbamate fungicide, (ii) an amount of at least one triazole fungicide, and (iii) an amount of at least one pyrazole-carboxamide fungicide, wherein the amount of the dithiocarbamate fungicide is less than the fungicidally effective amount of the compound of Formula I when the compound of Formula I is used alone, wherein the amount of the triazole fungicide is less than the fungicidally effective amount of the triazole fungicide when the triazole fungicide is used alone, and/or wherein the amount of the pyrazole-carboxamide fungicide is less than the fungicidally effective amount of the pyrazole-carboxamide fungicide when the pyrazole-carboxamide fungicide is used alone.

The present invention also provides a mixture comprising any one of the combinations disclosed herein.

The present invention also provides a fungicidal composition comprising any one of the combinations or mixtures disclosed herein.

The present invention also provides a method of treating a plant or a locus against fungal infection comprising applying an effective amount of any one of the combinations, mixtures or compositions disclosed herein to the plant or locus so as to thereby treat the plant or locus against fungal infection.

The present invention also provides use of any one of the combinations, mixtures or compositions disclosed herein for treating a plant or a locus against fungal infection.

The present invention also provides any one of the combinations, mixtures and compositions described herein for use in treating a plant or a locus against fungal infection.

The present invention also provides a package comprising any one of the combinations, mixtures or compositions disclosed herein.

The present invention also provides a process for the preparation any one of the combinations, mixtures or compositions disclosed herein from individual component parts.

DETAILED DESCRIPTION

Definitions

Figure 1:
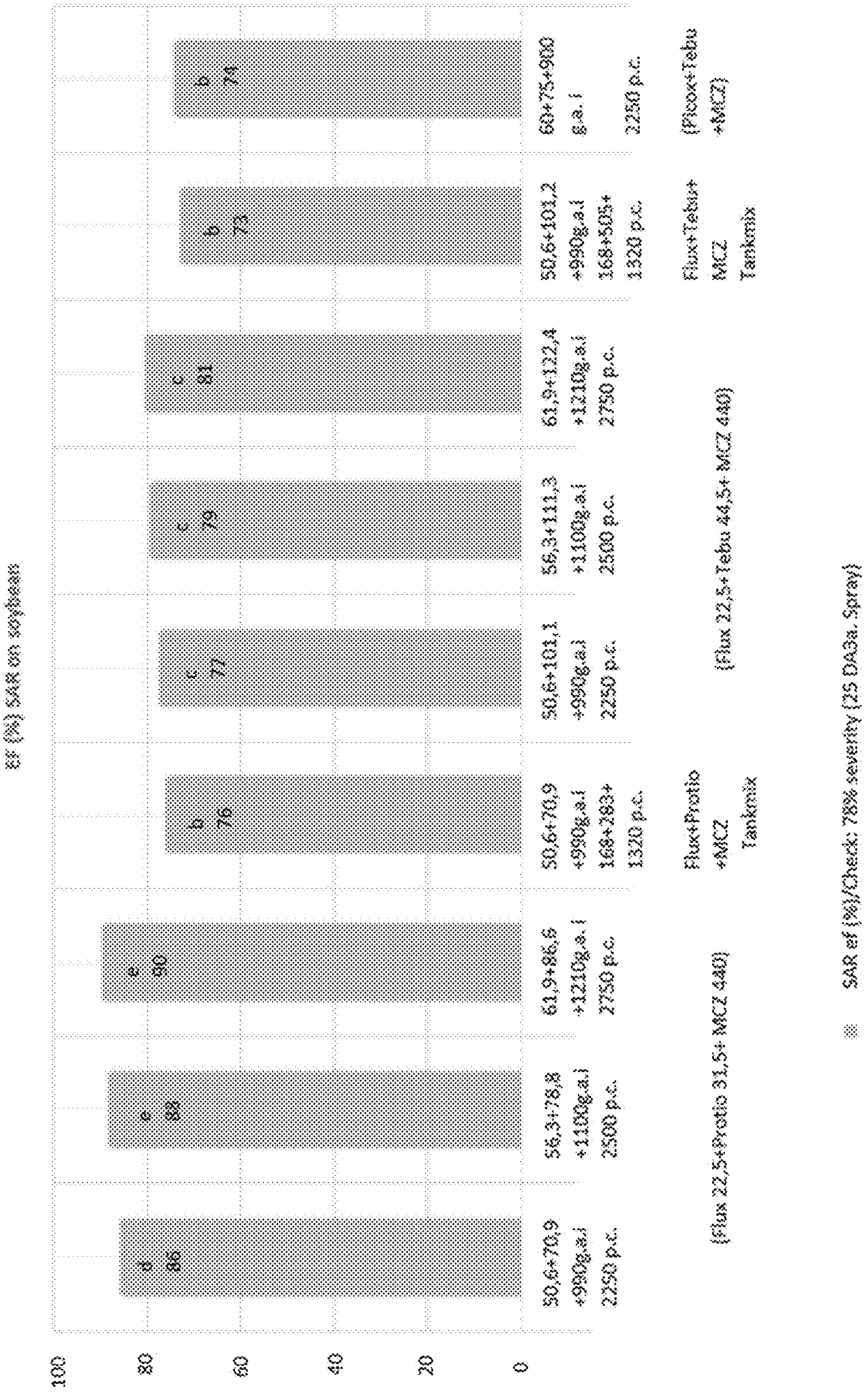
FIG. 1 shows the efficacy of the pre-mix compositions of Examples 1 and 2 in comparison with tank mixes of the same agents and a three-way pre-mix composition of tebuconazole, picoxystrobin and mancozeb (commercial standard) for controlling *Phakopsora pachyrhizi* affecting soybean plants of the BONUS cultivar (study conducted in Uberlandia-MG/Brazil).

Unless defined otherwise, all technical and scientific terms used herein have the meaning commonly understood by persons of ordinary skill in the art to which this subject matter belongs.

As used herein, the term “stable” when used in connection with a composition means that the composition is physically stable and chemically stable. As used herein, the term “chemically stable” means that no significant decomposition of the active components was observed after at least 2 weeks of storage in a sealed package at a temperature of 54° C. As used herein, the term “physically stable” means that no significant phase separation and/or sedimentation was observed after at least 2 weeks of storage in a sealed package at a temperature of 54° C.

Stability is assessed according to test protocol established by the Collaborative International Pesticides Analytical Council Ltd. (CIPAC), namely Accelerate Storage Procedure (CIPAC MT 46.3); Density (CIPAC MT 3.3.2) and Wet Sieve test (CIPAC MT 185). CIPAC test protocols are standard in the relevant industry for assessing before and after storage stability. Other parameters of stability, such as pourability and concentrations of the active components before and after storage, may be assessed using tests commonly used in the agrochemical industry. Stability can be assessed under normal storage conditions which is after two years storage at room temperature. Stability can also be assessed under accelerated storage conditions which is after 2 weeks storage at 54° C. or after 8 weeks at 40° C. or after 12 weeks at 35° C. or after 3 months at room temperature or at after 2 weeks at 0° C.

As used herein, the term “combination” means an assemblage of agrochemicals for application either by simultaneous or contemporaneous application.

As used herein, the term “simultaneous” when used in connection with application of agrochemicals means that the agrochemicals are applied in an admixture, for example, a tank mix. For simultaneous application, the combination may be the admixture or separate containers each containing an agrochemical that are combined prior to application.

As used herein, the term “contemporaneous” when used in connection with application of agrochemicals means that an individual agrochemical is applied separately from another agrochemical or premixture at the same time or at times sufficiently close together that an activity that is additive or more than additive or synergistic relative to the activity of either agrochemical alone at the same dose is achieved.

As used herein, the term “mixture” refers to, but is not limited to, a combination in any physical form, e.g., blend, solution, suspension, dispersion, emulsion, alloy, or the like.

As used herein, the term “tank mix” means one or more of the components of the combination, mixture or composition of the present invention are added are mixed in a spray tank at the time of spray application or prior to spray application.

As used herein, the term “composition” includes at least one of the combinations or mixtures of the present invention with an agriculturally acceptable carrier. The composition may be a formulation, including commercial formulation.

As used herein, the term “effective” when used in connection with an amount of the active ingredient, combination, mixture or composition refers to an amount of the active ingredient, combination, mixture or composition that achieve a agriculturally beneficial level of control of the fungus, pathogen, and/or disease when applied to a plant, propagation material of the plant, soil or a locus.

As used herein, the term “fungicidally effective amount” refers to an amount of the active component that is commercially recommended for use to control fungi. The commercially recommended amount for each active component, often specified as application rates of the commercial formulation, may be found on the label accompanying the commercial formulation. The commercially recommended application rates of the commercial formulation may vary depending on factors such as the plant species and the fungus to be controlled.

As used herein, the term “effective” when used in connection with a method for treating a plant or locus against fungal infection means that the method provides an agriculturally beneficial level of treatment without significantly interfering with the normal growth and development of the plant.

As used herein, the term “treating a plant or a locus against fungal infection” includes, but is not limited to, protecting the plant or locus against fungal infection and/or controlling fungal infection of the plant or locus.

As used herein, the term “protecting the plant or a locus against fungal infection” includes, but is not limited to, protecting the plant or locus against fungal attack, protecting the plant or locus from fungal disease, and/or preventing fungal infection of the plant or locus.

As used herein, the term “controlling fungal infection of the plant or locus” includes, but is not limited to, controlling fungal disease infecting the plant or locus, controlling a plant or soil disease caused by phytopathologic fungi, controlling fungal attack on the plant or locus, reducing fungal infection of the plant or locus, and/or curing plant or soil disease caused by phytopathologic fungi.

As used herein, the term “more effective for protecting the plant or locus against fungal attack” includes, but is not limited to, prolonging the duration of protection against fungal attack after application and extending the protection period against fungal attack.

As used herein, the term “more effective for controlling fungal disease” includes, but is not limited to, increasing efficacy of fungal disease control and reducing the amount of time needed to achieve a given level of fungal control.

As used herein, the term “agriculturally acceptable carrier” means carriers which are known and accepted in the art for the formation of compositions for agricultural or horticultural use.

As used herein, the term “adjuvant” is broadly defined as any substance that itself is not an active ingredient but which enhances or is intended to enhance the effectiveness of the fungicide with which it is used. Adjuvants may be understood to include, spreading agents, penetrants, compatibility agents, and drift retardants.

As used herein, the term “agriculturally acceptable inert additives” is defined as any substance that itself is not an active ingredient but is added to the composition such as sticking agents, surfactants, synergists, buffers, acidifiers, anti-oxidation agent, defoaming agents and thickeners.

As used herein, the term “plant” includes reference to the whole plant, plant organ (e.g., leaves, stems, twigs, roots, trunks, limbs, shoots, fruits etc.), plant cells, and propagation material of the plant.

As used herein the term “plant” includes reference to agricultural crops include field crops (soybean, maize, wheat, rice, etc.), vegetable crops (potatoes, cabbages, etc.) and fruits (peach, etc.).

As used herein the term “propagation material” is to be understood to denote all the generative parts of the plant such as seeds and spores, seedlings, and vegetative structures such as bulbs, corms, tubers, rhizomes, roots stems, basal shoots, stolons and buds.

As used herein, the term “locus” includes not only areas where fungal infection may already be shown, but also areas where fungal infection has yet to show, and also to areas under cultivation. Locus includes, but is not limited to, soil and other plant growth medium.

As used herein the term “ha” refers to hectare.

As used herein, the term “excipient” refers to any chemical which has no significant pesticidal activity, such as surfactant(s), solvent(s), or adjuvant(s). One or more excipients can be added to any combination, mixture or composition disclosed herein.

The term “a” or “an” as used herein includes the singular and the plural, unless specifically stated otherwise. Therefore, the terms “a,” “an,” or “at least one” can be used interchangeably in this application.

Throughout the application, descriptions of various embodiments use the term “comprising”; however, it will be understood by one of skill in the art, that in some specific instances, an embodiment can be described using the language “consisting essentially of” or “consisting of.”

The term “about” herein specifically includes ±10% from the indicated values in the range. In addition, the endpoints of all ranges directed to the same component or property herein are inclusive of the endpoints, are independently combinable, and include all intermediate points and ranges.

It is understood that where a parameter range is provided, all integers within that range, and tenths thereof, are also provided by the invention as if the integers and tenths thereof are expressly described herein. For example, “0.1-80 wt. %” includes 0.1 wt. %, 0.2 wt. %, 0.3 wt. %, 0.4 wt. %, 0.5 wt. %, etc. up to 80 wt. %.

All publications, patents and patent applications mentioned in this specification are herein incorporated in their entirety by reference into the specification, to the same extent as if each individual publication, patent or patent application was specifically and individually indicated to be incorporated herein by reference.

The following examples illustrate the practice of the present subject matter in some of its embodiments but should not be construed as limiting the scope of the present subject matter. Other embodiments apparent to persons of ordinary skill in the art from consideration of the specification and examples herein that fall within the spirit and scope of the appended claims are part of this invention. The specification, including the examples, is intended to be exemplary only, without limiting the scope and spirit of the invention.

Aspects and embodiments of the present invention will now be described.

Fungicidal Oil Liquid Compositions

Dithiocarbamate fungicides are normally formulated dry. Triazole fungicides are normally formulated as emulsifiable concentrates or suspension concentrates, where emulsifiable concentrates are known to be more efficient. Fluxapyroxad, which is a pyrazole-carboxamide, is normally formulated as emulsifiable concentrates or suspension concentrates. There is a need in the art for a stable oil liquid composition comprising a dithiocarbamate fungicide, a triazole fungicide and a pyrazole-carboxamide fungicide which is provided by the present invention.

In addition to being stable even after long periods of storage, the composition of the present invention also enhances the fungicidal activity of the active ingredients contained therein such that application of the composition is more effective for treating the plant or locus against fungal infection than when each fungicide at the same amount is applied in the form of a tank mix or applied separately. The composition of the present invention is also more effective for treating the plant or locus against fungal infection than known three-agent compositions, including a composition comprising a dithiocarbamate fungicide, a triazole fungicide, and a strobilurin fungicide described in PCT International Application Publication No. WO 2017/203527 A1.

The present invention provides a fungicidal oil liquid composition comprising:

(i) at least one dithiocarbamate fungicide,
(ii) at least one triazole fungicide,
(iii) at least one pyrazole-carboxamide fungicide, and
(iv) at least one agrochemically acceptable non-aqueous liquid carrier, wherein the dithiocarbamate fungicide is suspended in the liquid carrier and the triazole fungicide and the pyrazole-carboxamide fungicide are dissolved in the liquid carrier.

The present invention provides a stable fungicidal oil liquid composition comprising:

(i) at least one dithiocarbamate fungicide,
(ii) at least one triazole fungicide,
(iii) at least one pyrazole-carboxamide fungicide, and
(iv) at least one agrochemically acceptable non-aqueous liquid carrier, wherein the dithiocarbamate fungicide is suspended in the liquid carrier and the triazole fungicide and the pyrazole-carboxamide fungicide are dissolved in the liquid carrier.

In some embodiments, the dithiocarbamate fungicide is selected from the group consisting of mancozeb, maneb, metiram, propineb, thiram, zinc thiazole, zineb and ziram.

In some embodiments, the dithiocarbamate fungicide is mancozeb.

In some embodiments, the triazole fungicide is selected from the group consisting of azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, penconazole, propiconazole, simeconazole, tebuconazole, tetraconazole, triadimefon, triadimenol, triticonazole and prothioconazole.

In some embodiments, the triazole fungicide is prothioconazole.

In some embodiments, the triazole fungicide is tebuconazole.

In some embodiments, the pyrazole-carboxamide fungicide is selected from the group consisting of benzovindiflupyr, bixafen, fluxapyroxad, furametpyr, isopyrazam, penflufen, penthiopyrad and sedaxane.

In some embodiments, the pyrazole-carboxamide fungicide is fluxapyroxad.

For chemical classes of fungicides, as well as specific compounds of each class, see "The Pesticide Manual Eighteenth Edition" (British Crop Protection Council, Hampshire, UK, 2018), as well as "The e-Pesticide Manual, Version 5.2" (British Crop Protection Council, Hampshire, UK, 2008-2011), the contents of each of which are incorporated herein by reference in their entirety.

In a preferred embodiment, the subject matter relates to a fungicidal oil liquid composition comprising: a) mancozeb, b) tebuconazole, c) fluxapyroxad and d) a non-aqueous liquid carrier, wherein the mancozeb is suspended in the non-aqueous liquid carrier and the tebuconazole and fluxapyroxad are dissolved in the non-aqueous liquid carrier.

In another preferred embodiment, the subject matter relates to a fungicidal oil liquid composition comprising: a) mancozeb, b) prothioconazole, c) fluxapyroxad and d) a non-aqueous liquid carrier, wherein the mancozeb is suspended in the non-aqueous liquid carrier and the prothioconazole and fluxapyroxad are dissolved in the non-aqueous liquid carrier.

In some embodiments, the amount of the dithiocarbamate fungicide is about 0.1-80 wt. % based on the total weight of the composition. In some embodiments, the amount of the dithiocarbamate fungicide is about 10-60 wt. % based on the total weight of the composition. In some embodiments, the amount of dithiocarbamate fungicide is about 20-50 wt. % based on the total weight of the composition. In some embodiments, the amount of the dithiocarbamate fungicide is about 30-40 wt. % based on the total weight of the composition. In some embodiments, the amount of the dithiocarbamate fungicide is about 35 wt. % based on the total weight of the composition.

In some embodiments, the amount of the dithiocarbamate fungicide in the composition is about 300-600 g/L. In some embodiments, the amount of the dithiocarbamate fungicide in the composition is about 400-500 g/L. In some embodiments, the amount of the dithiocarbamate fungicide in the composition is about 418-462 g/L. In some embodiments, the amount of the dithiocarbamate fungicide in the composition is about 440 g/L.

In some embodiments, the amount of the triazole fungicide and the pyrazole-carboxamide fungicide together is about 0.1-20 wt. % based on the total weight of the composition. In some embodiments, the amount of the triazole fungicide and the pyrazole-carboxamide fungicide together is about 1-10 wt. % based on the total weight of the composition. In some embodiments, the amount of the triazole fungicide and the pyrazole-carboxamide fungicide together is about 4-7 wt. % based on the total weight of the composition. In some embodiments, the amount of the triazole fungicide and the pyrazole-carboxamide fungicide together is about 5-6 wt. % based on the total weight of the composition. In some embodiments, the amount of the triazole fungicide and the pyrazole-carboxamide fungicide together is about 5.5 wt. % based on the total weight of the composition. In some embodiments, the amount of the triazole fungicide and the pyrazole-carboxamide fungicide together is 5.38 wt. % based on the total weight of the composition. In some embodiments, the amount of the triazole fungicide and the pyrazole-carboxamide fungicide together is about 3-6 wt. % based on the total weight of the composition. In some embodiments, the amount of the triazole fungicide and the pyrazole-carboxamide fungicide together is about 4-5 wt. % based on the total weight of the composition. In some embodiments, the amount of the triazole fungicide and the pyrazole-carboxamide fungicide together is about 4.5 wt. % based on the total weight of the composition. In some embodiments, the amount of the triazole fungicide and the pyrazole-carboxamide fungicide together is 4.25 wt. % based on the total weight of the composition.

In some embodiments, the amount of the triazole fungicide is about 0.1-15 wt. % based on the total weight of the composition. In some embodiments, the amount of the triazole fungicide is about 1-10 wt. % based on the total weight of the composition. In some embodiments, the amount of the triazole fungicide is about 2-5 wt. % based on the total weight of the composition. In some embodiments, the amount of the triazole fungicide is about 3-4 wt. % based on the total weight of the composition. In some embodiments, the amount of the triazole fungicide is about 3.5 wt. % based on the total weight of the composition. In some embodiments, the amount of the triazole fungicide is 3.57 wt. % based on the total weight of the composition. In some embodiments, the amount of the triazole fungicide is about 1-4 wt. % based on the total weight of the composition. In some embodiments, the amount of the triazole fungicide is about 2-3 wt. % based on the total weight of the composition. In some embodiments, the amount of the triazole fungicide is about 2.5 wt. % based on the total weight of the composition. In some embodiments, the amount of the triazole fungicide is 2.48 wt. % based on the total weight of the composition.

In some embodiments, the amount of the triazole fungicide in the composition is about 20-60 g/L. In some embodiments, the amount of the triazole fungicide in the composition is about 40-50 g/L. In some embodiments, the amount of the triazole fungicide in the composition is 40.05-48.95 g/L. In some embodiments, the amount of the triazole fungicide in the composition is about 44.5 g/L. In some embodiments, the amount of the triazole fungicide in the composition is about 25-35 g/L. In some embodiments, the amount of the triazole fungicide in the composition is about 28.35-34.65 g/L. In some embodiments, the amount of the triazole fungicide in the composition is about 31.5 g/L.

In some embodiments, the amount of the pyrazole-carboxamide fungicide is about 0.1-10 wt. % based on the total weight of the composition. In some embodiments, the amount of the pyrazole-carboxamide fungicide is about 0.1-5 wt. % based on the total weight of the composition. In some embodiments, the amount of the pyrazole-carboxamide fungicide is about 1-2 wt. % based on the total weight of the composition. In some embodiments, the amount of the pyrazole-carboxamide fungicide is about 1.7 wt. % based on the total weight of the composition. In some embodiments, the amount of the pyrazole-carboxamide fungicide is about 1.8 wt. % based on the total weight of the composition. In some embodiments, the amount of the pyrazole-carboxamide fungicide is about 1.77 wt. % based on the total weight of the composition. In some embodiments, the amount of the pyrazole-carboxamide fungicide is about 1.81 wt. % based on the total weight of the composition.

In some embodiments, the amount of the pyrazole-carboxamide fungicide in the composition is about 15-30 g/L. In some embodiments, the amount of the pyrazole-carboxamide fungicide in the composition is about 19.13-25.88 g/L. In some embodiments, the amount of the pyrazole-carboxamide fungicide in the composition is about 22.5 g/L.

In some embodiments, the composition comprises at least one non-aqueous liquid carrier. The non-aqueous liquid carrier may include but is not limited to aromatic hydrocarbons (e.g. toluene, o-, m-, p-xylene, ethylbenzene, isopropylbenzene, tert-butylbenzene, naphthalenes, mono- or polyalkyl-substituted naphthalenes), paraffins (e.g. octane, nonane, decane, undecane, dodecane, tridecane, tetradecane, pentadecane, hexadecane, hepta-decane, octa-decane, nonadecane, eicosane, heneicosane, docosane, tricosane, tetracosane, pentacosane, and branched chain isomers thereof), petroleum, alcohols (e.g. 2-ethyl hexanol), ketones (e.g. acetophenone, cyclohexanone), vegetable oil (e.g. olive oil, kapok oil, castor oil, papaya oil, camellia oil, palm oil, sesame oil, corn oil, rice bran oil, peanut oil, cotton seed oil, soybean oil, rapeseed oil, linseed oil, tung oil, sunflower oil, safflower oil, tall oil), alkyl ester of vegetable oils, (e.g. rapeseed oil methyl ester or rapeseed oil ethyl ester, rapeseed oil propyl esters, rapeseed oil butyl esters, soybean oil methyl ester, tall oil fatty acids esters etc.), diesel, mineral oil, alkyl amides (e.g. N,N-dimethyl decanamide), fatty acid amides (e.g. C1-C3 amines, alkylamines or alkanolamines with C6-C18 carboxylic acids), fatty acids, tall oil fatty acids, alkyl esters of fatty acids (e.g. C1-C4 monohydric alcohol esters of C8 to C22 fatty acids such as methyl oleate, ethyl oleate), modified vegetable oils and combinations thereof.

In some embodiments, the non-aqueous liquid carrier is selected from the group consisting of aromatic hydrocarbons, alkyl amides, alkyl ester of vegetable oils, alcohols and any combination thereof.

In some embodiments, the total amount of non-aqueous liquid carrier in the composition is about 0.1-80 wt. % based on the total weight of the composition. In some embodiments, the total amount of non-aqueous liquid carrier in the composition is about 1-60 wt. % based on the total weight of the composition. In some embodiments, the total amount of non-aqueous liquid carrier in the composition is about 10-50 wt. % based on the total weight of the composition. In some embodiments, the total amount of non-aqueous liquid carrier in the composition is about 20-50 wt. % based on the total weight of the composition. In some embodiments, the total amount of non-aqueous liquid carrier in the composition is about 35-45 wt. % based on the total weight of the composition. In some embodiments, the total amount of non-aqueous liquid carrier in the composition is about 35-40 wt. % based on the total weight of the composition. In some embodiments, the total amount of non-aqueous liquid carrier in the composition is 38.21-39 wt. % based on the total weight of the composition. In some embodiments, the total amount of non-aqueous liquid carrier in the composition is about 39 wt. % based on the total weight of the composition. In some embodiments, the total amount of non-aqueous liquid carrier in the composition is about 35-36 wt. % based on the total weight of the composition. In some embodiments, the total amount of non-aqueous liquid carrier in the composition is about 35 wt. % based on the total weight of the composition. In some embodiments, the total amount of non-aqueous liquid carrier in the composition is 34.65-35.45 wt. % based on the total weight of the composition. In some embodiments, the total amount of non-aqueous liquid carrier in the composition is 35.45 wt. % based on the total weight of the composition.

In some embodiments, the non-aqueous liquid carrier comprises at least one aromatic hydrocarbon. In some embodiments, the non-aqueous liquid carrier is an aromatic hydrocarbon. In some embodiments, the aromatic hydrocarbon is naphthalene. In some embodiments, the aromatic hydrocarbon is solvent naphtha aromatic heavy 200. In some embodiments, the aromatic hydrocarbon is Solvesso™ 200 (sold by Exxon Mobil). In some embodiments, the aromatic hydrocarbon is solvent naphtha aromatic 150. In some embodiments, the aromatic hydrocarbon is Solvesso™ 150 (sold by Exxon Mobil). In some embodiments, the aromatic hydrocarbon is solvent naphtha aromatic 100. In some embodiments, the aromatic hydrocarbon is Solvesso™ 100 (sold by Exxon Mobil). In some embodiments, the aromatic hydrocarbon has CAS No. 64742-94-5. The aromatic hydrocarbon has CAS No. 64742-95-6.

In some embodiments, the amount of the aromatic hydrocarbon in the composition is about 0.1-60 wt. % based on the total weight of the composition. In some embodiments, the amount of the aromatic hydrocarbon in the composition is about 0.1-30 wt. % based on the total weight of the composition. In some embodiments, the amount of the aromatic hydrocarbon in the composition is about 1-20 wt. % based on the total weight of the composition. In some embodiments, the amount of the aromatic hydrocarbon in the composition is about 10-15 wt. % based on the total weight of the composition. In some embodiments, the amount of the aromatic hydrocarbon in the composition is about 11-12 wt. % based on the total weight of the composition. In some embodiments, the amount of the aromatic hydrocarbon in the composition is about 11 wt. % based on the total weight of the composition. In some embodiments, the amount of the aromatic hydrocarbon in the composition is 11.24 wt. % based on the total weight of the composition. In some embodiments, the amount of the aromatic hydrocarbon in the composition is about 12 wt. % based on the total weight of the composition. In some embodiments, the amount of the aromatic hydrocarbon in the composition is 11.81 wt. % based on the total weight of the composition.

In some embodiments, the non-aqueous liquid carrier comprises at least one alkyl amide. In some embodiments, the non-aqueous liquid carrier is an alkyl amide. In some embodiments, the non-aqueous carrier is a decanamide optionally substituted with at least one alkyl. In some embodiments, the non-aqueous carrier is a decanamide optionally substituted with at two alkyls. In some embodiments, the alkyl amide is N,N-dimethyl decanamide. The N,N-dimethyl decanamide has CAS No. 14433-76-2. In some embodiments, the N,N-dimethyl decanamide is Hallomid® M-10 (sold by Stepan). In some embodiments, the non-aqueous carrier is an octanamide optionally substituted with at least one alkyl. In some embodiments, the non-aqueous carrier is an octanamide optionally substituted with at two alkyls. In some embodiments, the non-aqueous carrier is N,N-dimethyl-octanamide. In some embodiments, the non-aqueous carrier is a mixture of N,N-dimethyl-octanamide and N,N-dimethyl decanamide.

The use of alkyl amide, preferably octanamide and/or decanamide, as the non-aqueous carrier stabilizes the solution of the pyrazole-carboxamide fungicide because the amide group of the non-aqueous carrier interacts strongly with the pyrazole-carboxamide fungicide (for example, fluxapyroxad) and prevents crystal growth in the composition.

In some embodiments, the amount of the alkyl amide in the composition is about 0.1-30 wt. % based on the total weight of the composition. In some embodiments, the amount of the alkyl amide in the composition is about 0.1-20 wt. % based on the total weight of the composition. In some embodiments, the amount of the alkyl amide in the composition is about 0.1-10 wt. % based on the total weight of the composition. In some embodiments, the amount of the alkyl amide in the composition is about 1-5 wt. % based on the total weight of the composition. In some embodiments, the amount of the alkyl amide in the composition is about 2-3 wt. % based on the total weight of the composition. In some embodiments, the amount of the alkyl amide in the composition is about 3-4 wt. % based on the total weight of the composition. In some embodiments, the amount of the alkyl amide in the composition is 2.81 wt. % based on the total weight of the composition. In some embodiments, the amount of the alkyl amide in the composition is 3.15 wt. % based on the total weight of the composition.

In some embodiments, the non-aqueous liquid carrier comprises at least one alkyl ester of vegetable oil. In some embodiments, the non-aqueous liquid carrier is an alkyl ester of vegetable oil. In some embodiments, the alkyl ester of vegetable oil is an alkyl ester of soybean oil. In some embodiments, the alkyl ester of vegetable oil is a methyl ester of soybean oil. In some embodiments, the methyl ester of soybean oil has CAS No. 67784-62-9. In some embodiments, the methyl ester of soybean oil is methylated soybean oil (sold by Cargill).

In some embodiments, the amount of the alkyl ester of vegetable oil in the composition is about 0.1-50 wt. % based on the total weight of the composition. In some embodiments, the amount of the alkyl ester of vegetable oil in the composition is about 1-40 wt. % based on the total weight of the composition. In some embodiments, the amount of the alkyl ester of vegetable oil in the composition is about 1-30 wt. % based on the total weight of the composition. In some embodiments, the amount of the alkyl ester of vegetable oil in the composition is about 5-30 wt. % based on the total weight of the composition. In some embodiments, the amount of the alkyl ester of vegetable oil in the composition is about 10-20 wt. % based on the total weight of the composition. In some embodiments, the amount of the alkyl ester of vegetable oil in the composition is about 10-15 wt. % based on the total weight of the composition. In some embodiments, the amount of the alkyl ester of vegetable oil in the composition is about 20-30 wt. % based on the total weight of the composition. In some embodiments, the amount of the alkyl ester of vegetable oil in the composition is about 20-25 wt. % based on the total weight of the composition. In some embodiments, the amount of the alkyl ester of vegetable oil in the composition is about 13-14 wt. % based on the total weight of the composition. In some embodiments, the amount of the alkyl ester of vegetable oil in the composition is about 13 wt. % based on the total weight of the composition. In some embodiments, the amount of the alkyl ester of vegetable oil in the composition is 12.57-13.37 wt. % based on the total weight of the composition. In some embodiments, the amount of the alkyl ester of vegetable oil in the composition is 13.37 wt. % based on the total weight of the composition. In some embodiments, the amount of the alkyl ester of vegetable oil in the composition is about 24-25 wt. % based on the total weight of the composition. In some embodiments, the amount of the alkyl ester of vegetable oil in the composition is 23.5-24.04 wt. % based on the total weight of the composition. In some embodiments, the amount of the alkyl ester of vegetable oil in the composition is about 24 wt. % based on the total weight of the composition. In some embodiments, the amount of the alkyl ester of vegetable oil in the composition is 24.04 wt. % based on the total weight of the composition.

In some embodiments, the non-aqueous carrier comprises at least one alcohol. In some embodiments, the non-aqueous liquid carrier is an alcohol. In some embodiments, the alcohol is 2-ethyl hexanol. The 2-ethyl hexanol has CAS No. 104-76-7. In some embodiments, the 2-ethyl hexanol is sold by Elekeiroz. It was observed that in compositions comprising tebuconazole, especially a high concentration of tebuconazole, a viscous layer may form in the bottom of the package. 2-ethyl hexanol has good polarity and low viscosity. The use of 2-ethyl hexanol in the composition prevents formation of the viscous layer.

In some embodiments, the amount of alcohol in the composition is about 0.1-30 wt. % based on the total weight of the composition. In some embodiments, the amount of alcohol in the composition is about 1-20 wt. % based on the total weight of the composition. In some embodiments, the amount of alcohol in the composition is about 1-10 wt. % based on the total weight of the composition. In some embodiments, the amount of alcohol in the composition is about 5-10 wt. % based on the total weight of the composition. In some embodiments, the amount of alcohol in the composition is about 8-9 wt. % based on the total weight of the composition. In some embodiments, the amount of alcohol in the composition is 8.03 wt. % based on the total weight of the composition.

In some embodiments, the composition comprises at least two non-aqueous liquid carriers. In some embodiments, the composition comprises at least three non-aqueous liquid carriers. In some embodiments, the composition comprises three non-aqueous liquid carriers. In some embodiments, the composition comprises four non-aqueous liquid carriers.

In some embodiments, the non-aqueous liquid carrier is a combination of an aromatic hydrocarbon, an alkyl amide, and an alkyl ester of vegetable oil.

In some embodiments, the non-aqueous liquid carrier is a combination of solvent naphtha aromatic heavy 200, N,N-dimethyl decanamide, and methyl ester of soybean oil.

In some embodiments, the non-aqueous liquid carrier is a combination of an aromatic hydrocarbon, an alkyl amide, an alkyl ester of vegetable oil and an alcohol.

In some embodiments, the non-aqueous liquid carrier is a combination of solvent naphtha aromatic heavy 200, N,N-dimethyl decanamide, methyl ester of soybean oil and 2-ethyl hexanol.

In some embodiments, the non-aqueous liquid carrier is a combination of an aromatic hydrocarbon and an alkyl amide. A combination of an aromatic hydrocarbon, such as Solvesso™, and an alkyl amide, such as a decanamide, as the non-aqueous liquid carrier assures the solubility of the pyrazole-carboxamide fungicide and the triazole fungicide.

In some embodiments, the non-aqueous liquid carrier is a combination of an aromatic hydrocarbon, an alkyl amide, and an alcohol. In some embodiments, the non-aqueous liquid carrier is a combination of (i) a solvent naphtha, (ii) N,N-dimethyl-octanamide, N,N-dimethyl decanamide, or a mixture thereof, and (iii) 2-ethyl hexanol.

In some embodiments, the composition comprises at least one adjuvant. In some embodiments, the adjuvant is in the liquid carrier.

The adjuvant may include but is not limited to vegetable oils, alkyl esters of vegetable oils such as for example, soy methyl ester, soy ethyl ester, rapeseed oil methyl ester or rapeseed oil ethyl ester, alkoxylated sorbitan esters such as for example sorbitan monolaurate alkoxylates such as for example polyoxyethylene (16) sorbitan monolaurate (Tween™ 24), polyoxyethylene (20) sorbitan monolaurate (Tween™ 20; Alkamuls® PSML-20), polyoxyethylene (4) sorbitan monolaurate (Tween™ 21), polyoxyethylene (8) sorbitan monolaurate (Tween™ 22), polyoxyethylene (12) sorbitan monolaurate (Tween™ 23), sorbitan monolaurate (Alkamuls® S/20, Glycomul® LK, Glycomul® LC, Span® 20), polyoxyethylene (20) sorbitan monostearate alkoxylates such as for example polyoxyethylene (20) sorbitan monostearate (Tween™ 60), polyoxyethylene (4) sorbitan monostearate (Tween™ 61), sorbitan monostearate (Alkamuls® S/90, Glycomul® S, Span® 60), sorbitan monooleate alkoxylates such as for example polyoxyethylene (20) sorbitan monooleate (Tween™ 80, Emulgin® SMO 20, T-Maz® 80, Agnique® SMO 20U), polyoxyethylene (5) sorbitan monooleate (Tween™ 81), sorbitan monooleate (Alkamuls® S/80, Span® 80), and combinations thereof.

In some embodiments, the adjuvant is tall oil fatty acids (TOFA) and/or soy methyl ester and/or sorbitan monolaurate alkoxylates such as polyoxyethylene (16) sorbitan monolaurate. In some embodiments, the adjuvant is a sorbitan monolaurate alkoxylate. In some embodiments, the adjuvant is polyoxyethylene (16) sorbitan monolaurate. In some embodiments, the adjuvant is Tween™ 24 (sold by Croda).

In some embodiments, the amount of the adjuvant in the composition is about 0.1-80 wt. % based on the total weight of the composition. In some embodiment, the amount of the adjuvant in the composition is about 1-20 wt. % based on the total weight of the composition. In some embodiment, the amount of the adjuvant in the composition is about 10-15 wt. % based on the total weight of the composition. In some embodiment, the amount of the adjuvant in the composition is about 11-12 wt. % based on the total weight of the composition. In some embodiment, the amount of the adjuvant in the composition is about 12-13 wt. % based on the total weight of the composition. In some embodiment, the amount of the adjuvant in the composition is about 12 wt. % based on the total weight of the composition. In some embodiment, the amount of the adjuvant in the composition is 11.81 wt. % based on the total weight of the composition. In some embodiment, the amount of the adjuvant in the composition is 12.05 wt. % based on the total weight of the composition.

In some embodiments, the fungicidal oil liquid composition further comprises at least one surfactant. The surfactant may include but is not limited to alkyl sulfonates, alkyl benzene sulfonates, alkyl aryl sulfonates, alkylphenolalkoxylates, tristyrylphenol ethoxylates, natural or synthetic fatty ethoxylate alcohols, natural or synthetic fatty acid alkoxylates, natural or synthetic fatty alcohols alkoxylates, alkoxylated alcohols (such as n-butyl alcohol poly glycol ether), block copolymers (such as ethylene oxide-propylene oxide block copolymers and ethylene oxide-butylene oxide block copolymers) or combinations thereof.

In some embodiments, the surfactant is selected from the group consisting of tristyrylphenol ethoxylates, alkyl benzene sulfonates and salts thereof, ethylene oxide-propylene oxide block copolymers and any combination thereof.

In some embodiments, the composition comprises at least two surfactants. In some embodiments, the composition comprises at least three surfactants. In some embodiments, the composition comprises three surfactants.

In some embodiments, the total amount of surfactants in the composition is about 0.1-40 wt. % based on the total weight of the composition. In some embodiments, the total amount of in the composition is about 1-40 wt. % based on the total weight of the composition. In some embodiments, the total amount of in the composition is about 1-25 wt. % based on the total weight of the composition. In some embodiments, the total amount of in the composition is about 1-15 wt. % based on the total weight of the composition. In some embodiments, the total amount of in the composition is about 5-15 wt. % based on the total weight of the composition. In some embodiments, the total amount of in the composition is about 7-10 wt. % based on the total weight of the composition. In some embodiments, the total amount of in the composition is about 8-9 wt. % based on the total weight of the composition. In some embodiments, the total amount of in the composition is about 9-12 wt. % based on the total weight of the composition. In some embodiments, the total amount of in the composition is about 10-11 wt. % based on the total weight of the composition. In some embodiments, the total amount of in the composition is about 8.5 wt. % based on the total weight of the composition. In some embodiments, the total amount of in the composition is about 10 wt. % based on the total weight of the composition. In some embodiments, the total amount of in the composition is 8.69 wt. % based on the total weight of the composition. In some embodiments, the total amount of in the composition is 10.13 wt. % based on the total weight of the composition.

In some embodiments, the composition comprises a tristyrylphenol ethoxylate. In some embodiment, the tristyrylphenol ethoxylate is tristyrylphenol ethoxylated 16 EO. The tristyrylphenol ethoxylated 16 EO has CAS No. 99734-09-05. In some embodiment, the tristyrylphenol ethoxylate is Surfom® CE 1299 (sold by Oxiteno).

In some embodiments, the amount of tristyrylphenol ethoxylate in the composition is about 0.1-20 wt. % based on the total weight of the composition. In some embodiments, the amount of tristyrylphenol ethoxylate in the composition is about 0.5-10 wt. % based on the total weight of the composition. In some embodiments, the amount of tristyrylphenol ethoxylate in the composition is about 0.5-5 wt. % based on the total weight of the composition. In some embodiments, the amount of tristyrylphenol ethoxylate in the composition is about 1-2 wt. % based on the total weight of the composition. In some embodiments, the amount of tristyrylphenol ethoxylate in the composition is 1.69 wt. % based on the total weight of the composition. In some embodiments, the amount of tristyrylphenol ethoxylate in the composition is 1.65 wt. % based on the total weight of the composition.

In some embodiments, the composition comprises an alkyl benzene sulfonate or a salt thereof. In some embodiments, the alkyl benzene sulfonate is docecylbenzene sulfonate. In some embodiments, the alkyl benzene sulfonate salt is an alkyl benzene sulfonate calcium salt. In some embodiments, the alkyl benzene sulfonate salt is docecylbenzene sulfonate calcium salt. The docecylbenzene sulfonate calcium salt has CAS No. 26264-06-2. In some embodiments, the docecylbenzene sulfonate calcium salt is Rhodacal® 60/BE (sold by Solvay).

In some embodiments, the amount of alkyl benzene sulfonate or salt thereof in the composition is about 0.1-30 wt. % based on the total weight of the composition. In some embodiments, the amount of alkyl benzene sulfonate or salt thereof in the composition is about 1-20 wt. % based on the total weight of the composition. In some embodiments, the amount of alkyl benzene sulfonate or salt thereof in the composition is about 1-10 wt. % based on the total weight of the composition. In some embodiments, the amount of alkyl benzene sulfonate or salt thereof in the composition is about 5-8 wt. % based on the total weight of the composition. In some embodiments, the amount of alkyl benzene sulfonate or salt thereof in the composition is about 6-7 wt. % based on the total weight of the composition. In some embodiments, the amount of alkyl benzene sulfonate or salt thereof in the composition is about 6.83 wt.

% based on the total weight of the composition. In some embodiments, the amount of alkyl benzene sulfonate or salt thereof in the composition is 6.69 wt. % based on the total weight of the composition.

In some embodiments, the composition comprises an ethylene oxide-propylene oxide block copolymer.

In some embodiments, the ethylene oxide-propylene oxide block copolymer has CAS No. 9038-95-3. In some embodiments, the ethylene oxide-propylene oxide block copolymer is Atlas™ 5002 L LQ (CQ) (sold by Croda). In some embodiments, the ethylene oxide-propylene oxide block copolymer has CAS No. 9003-11-6. In some embodiments, the ethylene oxide-propylene oxide block copolymer is Symperonic PE/F 68FL (sold by Croda).

In some embodiments, the amount of ethylene oxide-propylene oxide block copolymer in the composition is about 0.1-15 wt. % based on the total weight of the composition. In some embodiments, the amount of ethylene oxide-propylene oxide block copolymer in the composition is about 0.1-10 wt. % based on the total weight of the composition. In some embodiments, the amount of ethylene oxide-propylene oxide block copolymer in the composition is about 0.1-5 wt. % based on the total weight of the composition. In some embodiments, the amount of ethylene oxide-propylene oxide block copolymer in the composition is about 0.1-2 wt. % based on the total weight of the composition. In some embodiments, the amount of ethylene oxide-propylene oxide block copolymer in the composition is about 0.1-1 wt. % based on the total weight of the composition. In some embodiments, the amount of ethylene oxide-propylene oxide block copolymer in the composition is about 1-2 wt. % based on the total weight of the composition. In some embodiments, the amount of ethylene oxide-propylene oxide block copolymer in the composition is about 0.1-0.5 wt. % based on the total weight of the composition. In some embodiments, the amount of ethylene oxide-propylene oxide block copolymer in the composition is about 1.5-2 wt. % based on the total weight of the composition. In some embodiments, the amount of ethylene oxide-propylene oxide block copolymer in the composition is about 0.3-0.4 wt. % based on the total weight of the composition. In some embodiments, the amount of ethylene oxide-propylene oxide block copolymer in the composition is about 0.35 wt. % based on the total weight of the composition. In some embodiments, the amount of ethylene oxide-propylene oxide block copolymer in the composition is 1.61 wt. % based on the total weight of the composition.

In some embodiments, the composition comprises a tristyrylphenol ethoxylate, an alkyl benzene sulfonate or a salt thereof and an ethylene oxide-propylene oxide block copolymer.

In some embodiments, the composition comprises tristyrylphenol ethoxylated 16 EO, docecylbenzene sulfonate calcium salt and an ethylene oxide-propylene oxide block copolymer.

Other ingredients, such as adhesives, neutralizers, thickeners, binders, sequestrates, biocides, stabilizers, suspension aid, buffers preservatives, antioxidants, anti-foaming agents or anti-freeze agents, may also be added to the present compositions in order to increase the stability, density, and viscosity of the described compositions.

In some embodiments, the composition comprises an anti-foaming agent. In some embodiments, the anti-foaming agent is polydimethylsiloxane. In some embodiments, the polydimethylsiloxane has CAS No. 63148-62-9. In some embodiments, the polydimethylsiloxane is Silcolapse® 500 (sold by Elkem).

In some embodiments, the amount of the anti-foaming agent in the composition is about 0.01-10 wt. % based on the total weight of the composition. In some embodiments, the amount of the anti-foaming agent in the composition is about 0.01-5 wt. % based on the total weight of the composition. In some embodiments, the amount of the antifoaming agent in the composition is about 0.01-1 wt. % based on the total weight of the composition. In some embodiments, the amount of the anti-foaming agent in the composition is about 0.01-0.1 wt. % based on the total weight of the composition. In some embodiments, the amount of the anti-foaming agent in the composition is about 0.01-0.05 wt. % based on the total weight of the composition. In some embodiments, the amount of the anti-foaming agent in the composition is about 0.04 wt. % based on the total weight of the composition.

In some embodiments, the composition comprises a suspension aid. In some embodiments, the suspension aid is silica, fumed silica, silicic anhydride, silicon dioxide, and/or silicon dioxide amorphous. In some embodiments, the suspension aid is fumed silica. In some embodiments, the suspension aid has CAS No. 112945-52-5. In some embodiments, the suspension aid is CARB-O-SIL® M5 (sold by Cabot Corporation). Addition of a suspension aid, preferably silica, reduces caking in the composition.

In some embodiments, the amount of the suspension aid in the composition is about 0.01-20 wt. % based on the total weight of the composition. In some embodiments, the amount of the suspension aid in the composition is about 0.1-20 wt. % based on the total weight of the composition. In some embodiments, the amount of the suspension aid in the composition is about 0.1-10 wt. % based on the total weight of the composition. In some embodiments, the amount of the suspension aid in the composition is about 0.1-5 wt. % based on the total weight of the composition. In some embodiments, the amount of the suspension aid in the composition is about 0.1-1 wt. % based on the total weight of the composition. In some embodiments, the amount of the suspension aid in the composition is about 0.8 wt. % based on the total weight of the composition.

In some embodiments, the composition is free of a suspension aid. In some embodiments, the composition is free of fumed silica.

In some embodiments, the composition comprises a stabilizer. In some embodiments, the stabilizer is zinc oxide (CAS No. 1314-13-2). In some embodiments, the stabilizer is sold by Produquimica. It is preferred that the compositions described herein be compatible with most commercial glyphosate formulations. It was discovered that amphoteric surfactants (such as zinc oxide) or zwitterionic surfactants can promote this compatibility. Moreover, use of zinc oxide in the composition has an added advantage of promoting compatibility with glyphosate formulations without increasing viscosity of the composition. In some embodiments, the viscosity of the composition is between 500-2500 cp (speed 6, spindle 2). In some embodiments, the viscosity of the composition is between 500-2000 cp (speed 6, spindle 2). In some embodiments, the viscosity of the composition is between 800-1500 cp (speed 6, spindle 2).

In some embodiments, the amount of the stabilizer in the composition is about 0.1-10 wt. % based on the total weight of the composition. In some embodiments, the amount of the stabilizer in the composition is about 0.1-5 wt. % based on the total weight of the composition. In some embodiments, the amount of the stabilizer in the composition is about 1-2 wt. % based on the total weight of the composition. In some embodiments, the amount of the stabilizer in the composition is about 1.5 wt. % based on the total weight of the composition. In some embodiments, the amount of the stabilizer in the composition is 1.57 wt. % based on the total weight of the composition. In some embodiments, the amount of the stabilizer in the composition is about 1.6 wt. % based on the total weight of the composition. In some embodiments, the amount of the stabilizer in the composition is 1.61 wt. % based on the total weight of the composition.

In some embodiments, the composition has a pH of 5-9. In some embodiments, the composition has a pH of 5.5-8.5.

In some embodiments, the density of the composition at 20° C. is about 1-1.5 g/cm$^3$. In some embodiments, the density of the composition at 20° C. is 1.245 g/cm$^3$. In some embodiments, the density of the composition at 20° C. is 1.27 g/cm$^3$.

The present invention also provides fungicidal oil liquid composition comprising:

(i) 33-36 wt. % of mancozeb,
(ii) 2-3 wt. % of prothioconazole,
(iii) 1-2 wt. % of fluxapyroxad,
(iv) 2.5-3.5 wt. % of N,N-dimethyl decanamide,
(v) 1-2 wt. % of tristyrylphenol ethoxylated 16 EO,
(vi) 0.1-1 wt. % of ethylene oxide-propylene oxide block copolymer,
(vii) 10-13 wt. % of sorbitan monolaurate ethoxylated,
(viii) 6-7 wt. % of dodecylbenzene sulfonate calcium salt,
(ix) 0.01-0.1 wt. % of polydimethylsiloxane,
(x) 22-26 wt. % of methyl ester of soybean oil,
(xi) 10-13 wt. % of solvent naphtha aromatic heavy 200, and
(xii) 1-2 wt. % of zinc oxide.

The present invention also provides fungicidal oil liquid composition comprising:

(i) 33-36 wt. % of mancozeb,
(ii) 2-3 wt. % of prothioconazole,
(iii) 1-2 wt. % of fluxapyroxad,
(iv) 2.5-3.5 wt. % of N,N-dimethyl decanamide,
(v) 1-2 wt. % of tristyrylphenol ethoxylated 16 EO,
(vi) 0.1-1 wt. % of ethylene oxide-propylene oxide block copolymer,
(vii) 10-13 wt. % of sorbitan monolaurate ethoxylated,
(viii) 6-7 wt. % of dodecylbenzene sulfonate calcium salt,
(ix) 0.01-0.1 wt. % of polydimethylsiloxane,
(x) 22-26 wt. % of methyl ester of soybean oil,
(xi) 10-13 wt. % of solvent naphtha aromatic heavy 200,
(xii) 1-2 wt. % of zinc oxide, and
(xiii) 0-1 wt. % of silica.

The present invention also provides fungicidal oil liquid composition comprising:

(i) 33-36 wt. % of mancozeb,
(ii) 3-4 wt. % of tebuconazole,
(iii) 1-2 wt. % of fluxapyroxad,
(iv) 2-3 wt. % of N,N-dimethyl decanamide,
(v) 11-13 wt. % of sorbitan monolaurate ethoxylated,
(vi) 1-2 wt. % of tristyrylphenol ethoxylated 16 EO,
(vii) 6-7 wt. % of dodecylbenzene sulfonate calcium salt,
(viii) 0.01-0.1 wt. % of polydimethylsiloxane,
(ix) 11-15 wt. % of methyl ester of soybean oil,
(x) 10-13 wt. % of solvent naphtha aromatic heavy 200,
(xi) 1-2 wt. % of ethylene oxide-propylene oxide block copolymer,
(xii) 7.5-8.5 wt. % of 1-ethyl hexanol, and
(xiii) 1-2 wt. % of zinc oxide.

The present invention also provides fungicidal oil liquid composition comprising:

(i) 33-36 wt. % of mancozeb,
(ii) 3-4 wt. % of tebuconazole,
(iii) 1-2 wt. % of fluxapyroxad,
(iv) 2-3 wt. % of N,N-dimethyl decanamide,
(v) 11-13 wt. % of sorbitan monolaurate ethoxylated,
(vi) 1-2 wt. % of tristyrylphenol ethoxylated 16 EO,
(vii) 6-7 wt. % of dodecylbenzene sulfonate calcium salt, (viii) 0.01-0.1 wt. % of polydimethylsiloxane,
(ix) 11-15 wt. % of methyl ester of soybean oil,
(x) 10-13 wt. % of solvent naphtha aromatic heavy 200,
(xi) 1-2 wt. % of ethylene oxide-propylene oxide block copolymer,
(xii) 7.5-8.5 wt. % of 1-ethyl hexanol,
(xiii) 1-2 wt. % of zinc oxide, and
(xiv) 0-1 wt. % of silica.

The present invention also provides fungicidal oil liquid composition comprising:
(i) 34.64 wt. % of mancozeb,
(ii) 2.48 wt. % of prothioconazole,
(iii) 1.77 wt. % of fluxapyroxad,
(iv) 3.15 wt. % of N,N-dimethyl decanamide,
(v) 1.65 wt. % of tristyrylphenol ethoxylated 16 EO,
(vi) 0.35 wt. % of ethylene oxide-propylene oxide block copolymer,
(vii) 11.81 wt. % of sorbitan monolaurate ethoxylated,
(viii) 6.69 wt. % of dodecylbenzene sulfonate calcium salt,
(ix) 0.04 wt. % of polydimethylsiloxane,
(x) 24.04 wt. % of methyl ester of soybean oil,
(xi) 11.81 wt. % of solvent naphtha aromatic heavy 200, and
(xii) 1.57 wt. % of zinc oxide.

The present invention also provides fungicidal oil liquid composition comprising:
(i) 34.64 wt. % of mancozeb,
(ii) 2.48 wt. % of prothioconazole,
(iii) 1.77 wt. % of fluxapyroxad,
(iv) 3.15 wt. % of N,N-dimethyl decanamide,
(v) 1.65 wt. % of tristyrylphenol ethoxylated 16 EO,
(vi) 0.35 wt. % of ethylene oxide-propylene oxide block copolymer,
(vii) 11.81 wt. % of sorbitan monolaurate ethoxylated,
(viii) 6.69 wt. % of dodecylbenzene sulfonate calcium salt,
(ix) 0.04 wt. % of polydimethylsiloxane,
(x) 23.25-24.04 wt. % of methyl ester of soybean oil,
(xi) 11.81 wt. % of solvent naphtha aromatic heavy 200,
(xii) 1.57 wt. % of zinc oxide, and
(xiii) 0-0.79 wt. % of silica.

The present invention also provides fungicidal oil liquid composition comprising:
(i) 35.34 wt. % of mancozeb,
(ii) 3.57 wt. % of tebuconazole,
(iii) 1.81 wt. % of fluxapyroxad,
(iv) 2.81 wt. % of N,N-dimethyl decanamide,
(v) 12.05 wt. % of sorbitan monolaurate ethoxylated,
(vi) 1.69 wt. % of tristyrylphenol ethoxylated 16 EO,
(vii) 6.83 wt. % of dodecylbenzene sulfonate calcium salt,
(viii) 0.04 wt. % of polydimethylsiloxane,
(ix) 13.37 wt. % of methyl ester of soybean oil,
(x) 11.24 wt. % of solvent naphtha aromatic heavy 200,
(xi) 1.61 wt. % of ethylene oxide-propylene oxide block copolymer,
(xii) 8.03 wt. % of 1-ethyl hexanol, and
(xiii) 1.61 wt. % of zinc oxide.

The present invention also provides fungicidal oil liquid composition comprising:
(i) 35.34 wt. % of mancozeb,
(ii) 3.57 wt. % of tebuconazole,
(iii) 1.81 wt. % of fluxapyroxad,
(iv) 2.81 wt. % of N,N-dimethyl decanamide,
(v) 12.05 wt. % of sorbitan monolaurate ethoxylated,
(vi) 1.69 wt. % of tristyrylphenol ethoxylated 16 EO,
(vii) 6.83 wt. % of dodecylbenzene sulfonate calcium salt,
(viii) 0.04 wt. % of polydimethylsiloxane,
(ix) 12.57-13.37 wt. % of methyl ester of soybean oil,
(x) 11.24 wt. % of solvent naphtha aromatic heavy 200,
(xi) 1.61 wt. % of ethylene oxide-propylene oxide block copolymer,
(xii) 8.03 wt. % of 1-ethyl hexanol,
(xiii) 1.61 wt. % of zinc oxide, and
(xiv) 0-0.8 wt. % of silica.

In some embodiments, the composition is chemically stable.

In some embodiments, there is less than 35% decomposition of the dithiocarbamate fungicide in the composition after 2 weeks of storage at room temperature. In some embodiments, there is less than 35% decomposition of the dithiocarbamate fungicide in the composition after 2 weeks of storage at 54° C. In some embodiments, there is less than 35% decomposition of the dithiocarbamate fungicide in the composition after 8 weeks of storage at room temperature. In some embodiments, there is less than 35% decomposition of the dithiocarbamate fungicide in the composition after 8 weeks of storage at 40° C. In some embodiments, there is less than 35% decomposition of the dithiocarbamate fungicide in the composition after 1 week of storage at 0° C. In some embodiments, there is less than 35% decomposition of the dithiocarbamate fungicide in the composition after 1 week of storage at −10° C.

In some embodiments, there is less than 30%, less than 25%, less than 20%, less than 15%, less than 10%, less than 8%, less than 6%, less than 5%, less than 2.5% or less than 1% decomposition of the dithiocarbamate fungicide in the composition after 2 weeks of storage at room temperature. In some embodiments, there is less than 30%, less than 25%, less than 20%, less than 15%, less than 10%, less than 8%, less than 6%, less than 5%, less than 2.5% or less than 1% decomposition of the dithiocarbamate fungicide in the composition after 2 weeks of storage at 54° C. In some embodiments, there is less than 30%, less than 25%, less than 20%, less than 15%, less than 10%, less than 8%, less than 6%, less than 5%, less than 2.5% or less than 1% decomposition of the dithiocarbamate fungicide in the composition after 8 weeks of storage at room temperature. In some embodiments, there is less than 30%, less than 25%, less than 20%, less than 15%, less than 10%, less than 8%, less than 6%, less than 5%, less than 2.5% or less than 1% decomposition of the dithiocarbamate fungicide in the composition after 8 weeks of storage at 40° C. In some embodiments, there is less than 30%, less than 25%, less than 20%, less than 15%, less than 10%, less than 8%, less than 6%, less than 5%, less than 2.5% or less than 1% decomposition of the dithiocarbamate fungicide in the composition after 1 week of storage at 0° C. In some embodiments, there is less than 30%, less than 25%, less than 20%, less than 15%, less than 10%, less than 8%, less than 6%, less than 5%, less than 2.5% or less than 1% decomposition of the dithiocarbamate fungicide in the composition after 1 week of storage at −10° C.

In some embodiments, there is less than 20% decomposition of the triazole fungicide in the composition after 2 weeks of storage at room temperature. In some embodiments, there is less than 20% decomposition of the triazole fungicide in the composition after 2 weeks of storage at 54° C. In some embodiments, there is less than 10% decomposition of the triazole fungicide in the composition after 8 weeks of storage at room temperature. In some embodiments, there is less than 20% decomposition of the triazole fungicide in the composition after 8 weeks of storage at 40° C. In some embodiments, there is less than 20% decomposition of the triazole fungicide in the composition after 1 week of storage at 0° C. In some embodiments, there is less than 20% decomposition of the triazole fungicide in the composition after 1 week of storage at −10° C.

In some embodiments, there is less than 20%, less than 17%, less than 15%, less than 11%, less than 10%, less than 7.5%, less than 5%, less than 4%, less than 3%, less than 2% or less than 1% decomposition of the triazole fungicide in the composition after 2 weeks of storage at room temperature. In some embodiments, there is less than 20%, less than 17%, less than 15%, less than 11%, less than 10%, less than 7.5%, less than 5%, less than 4%, less than 3%, less than 2% or less than 1% decomposition of the triazole fungicide in the composition after 2 weeks of storage at 54° C. In some embodiments, there is less than 20%, less than 17%, less than 15%, less than 11%, less than 10%, less than 7.5%, less than 5%, less than 4%, less than 3%, less than 2% or less than 1% decomposition of the triazole fungicide in the composition after 8 weeks of storage at room temperature. In some embodiments, there is less than 20%, less than 17%, less than 15%, less than 11%, less than 10%, less than 7.5%, less than 5%, less than 4%, less than 3%, less than 2% or less than 1% decomposition of the triazole fungicide in the composition after 8 weeks of storage at 40° C. In some embodiments, there is less than 20%, less than 17%, less than 15%, less than 11%, less than 10%, less than 7.5%, less than 5%, less than 4%, less than 3%, less than 2% or less than 1% decomposition of the triazole fungicide in the composition after 1 week of storage at 0° C. In some embodiments, there is less than 20%, less than 17%, less than 15%, less than 11%, less than 10%, less than 7.5%, less than 5%, less than 4%, less than 3%, less than 2% or less than 1% decomposition of the triazole fungicide in the composition after 1 week of storage at −10° C.

In some embodiments, there is less than 15% decomposition of the pyrazole-carboxamide fungicide in the composition after 2 weeks of storage at room temperature. In some embodiments, there is less than 15% decomposition of the pyrazole-carboxamide fungicide in the composition after 2 weeks of storage at 54° C. In some embodiments, there is less than 15% decomposition of the pyrazole-carboxamide fungicide in the composition after 8 weeks of storage at room temperature. In some embodiments, there is less than 15% decomposition of the pyrazole-carboxamide fungicide in the composition after 8 weeks of storage at 40° C. In some embodiments, there is less than 15% decomposition of the pyrazole-carboxamide fungicide in the composition after 1 week of storage at 0° C. In some embodiments, there is less than 15% decomposition of the pyrazole-carboxamide fungicide in the composition after 1 week of storage at −10° C.

In some embodiments, there is less than 12.5%, less than 10%, less than 7.5%, less than 5%, less than 4%, less than 3%, less than 2% or less than 1% decomposition of the pyrazole-carboxamide fungicide in the composition after 2 weeks of storage at room temperature. In some embodiments, there is less than 12.5%, less than 10%, less than 7.5%, less than 5%, less than 4%, less than 3%, less than 2% or less than 1% decomposition of the pyrazole-carboxamide fungicide in the composition after 2 weeks of storage at 54° C. In some embodiments, there is less than 12.5%, less than 10%, less than 7.5%, less than 5%, less than 4%, less than 3%, less than 2% or less than 1% decomposition of the pyrazole-carboxamide fungicide in the composition after 8 weeks of storage at room temperature. In some embodiments, there is less than 12.5%, less than 10%, less than 7.5%, less than 5%, less than 4%, less than 3%, less than 2% or less than 1% decomposition of the pyrazole-carboxamide fungicide in the composition after 8 weeks of storage at 40° C. In some embodiments, there is less than 12.5%, less than 10%, less than 7.5%, less than 5%, less than 4%, less than 3%, less than 2% or less than 1% decomposition of the pyrazole-carboxamide fungicide in the composition after 1 week of storage at 0° C. In some embodiments, there is less than 12.5%, less than 10%, less than 7.5%, less than 5%, less than 4%, less than 3%, less than 2% or less than 1% decomposition of the pyrazole-carboxamide fungicide in the composition after 1 week of storage at −10° C.

In some embodiments, the composition is physically stable.

In some embodiments, there is less than 30%, less than 25%, less than 20%, less than 15%, less than 10%, less than 7.5%, less than 5%, less than 2.5% or less than 1% phase separation in the composition after 2 weeks of storage at room temperature. In some embodiments, there is less than 30%, less than 25%, less than 20%, less than 15%, less than 10%, less than 7.5%, less than 5%, less than 2.5% or less than 1% phrase separation in the composition after 2 weeks of storage at 54° C. In some embodiments, there is less than 30%, less than 25%, less than 20%, less than 15%, less than 10%, less than 7.5%, less than 5%, less than 2.5% or less than 1% phase separation in the composition after 8 weeks of storage at room temperature. In some embodiments, there is less than 30%, less than 25%, less than 20%, less than 15%, less than 10%, less than 7.5%, less than 5%, less than 2.5% or less than 1% phase separation in the composition after 8 weeks of storage at 40° C. In some embodiments, there is less than 30%, less than 25%, less than 20%, less than 15%, less than 10%, less than 7.5%, less than 5%, less than 2.5% or less than 1% phase separation in the composition after 1 week of storage at 0° C. In some embodiments, there is less than 30%, less than 25%, less than 20%, less than 15%, less than 10%, less than 7.5%, less than 5%, less than 2.5% or less than 1% phase separation in the composition after 1 week of storage at −10° C.

In some embodiments, there is 4% phase separation in the composition after 2 weeks of storage at room temperature. In some embodiments, there is 2% phase separation in the composition after 2 weeks of storage at room temperature. In some embodiments, there is 4% phrase separation in the composition after 2 weeks of storage at 54° C. In some embodiments, there is 25% phrase separation in the composition after 8 weeks of storage at room temperature. In some embodiments, there is 4% phrase separation in the composition after 8 weeks of storage at room temperature. In some embodiments, there is 8% phrase separation in the composition after 8 weeks of storage at 40° C. In some embodiments, there is 4% phase separation in the composition after 8 weeks of storage at 40° C. In some embodiments, there is no phase separation in the composition after 1 week of storage at 0° C. In some embodiments, there is 2% phase separation in the composition after 1 week of storage at 0° C. In some embodiments, there is no phase separation in the composition after 1 week of storage at −10° C. In some embodiments, there is 2% phase separation in the composition after 1 week of storage at −10° C.

In some embodiments, there is less than 2 mL, less than 1 mL or less than 0.5 mL of sediments per 250 mL of the composition after 2 weeks of storage at room temperature. In some embodiments, there is less than 2 mL, less than 1 mL or less than 0.5 mL of sediments per 250 mL of the composition after 2 weeks of storage at 54° C. In some embodiments, there is less than 2 mL, less than 1 mL or less than 0.5 mL of sediments per 250 mL of the composition after 8 weeks of storage at room temperature. In some embodiments, there is less than 2 mL, less than 1 mL or less than 0.5 mL of sediments per 250 mL of the composition after 8 weeks of storage at 40° C.

In some embodiments, there is 0.3 mL of sediments per 250 mL of the composition after 2 weeks of storage at room temperature. In some embodiments, there is 0.15 mL of sediments per 250 mL of the composition after 2 weeks of storage at room temperature. In some embodiments, there is 0.3 mL of sediments per 250 mL of the composition after 2 weeks of storage at 54° C. In some embodiments, there is 0.15 mL of sediments per 250 mL of the composition after 2 weeks of storage at 54° C. In some embodiments, there is 0.3 mL of sediments per 250 mL of the composition after 8 weeks of storage at room temperature. In some embodiments, there is 0.15 mL of sediments per 250 mL of the composition after 8 weeks of storage at room temperature. In some embodiments, there is 0.3 mL of sediments per 250 mL of the composition after 8 weeks of storage at 40° C. In some embodiments, there is 0.2 mL of sediments per 250 mL of the composition after 8 weeks of storage at 40° C.

In some embodiments, the composition is stored in a sealed container.

In some embodiments, the composition is more effective for treating the plant or locus against fungal infection than when each fungicide at the same amount is applied in a form other than the compositions described herein.

In some embodiments, the composition is more effective for treating the plant or locus against fungal infection than when each fungicide at the same amount is applied in the form of a tank mix.

In some embodiments, the composition is more effective for treating the plant or locus against fungal infection than when each fungicide at the same amount is applied separately.

The compositions described herein may be used in combination with one or more other pesticides to control a wider variety of undesirable pests. When used in combination with other pesticides, the herein described composition maybe formulated with the other pesticide/s, tank mixed with the other pesticide/s or applied sequentially with the other pesticide/s. In addition, herein described composition may, optionally, be combined with or blended with other pesticide compositions. This blend of pesticide may be used to control pests in crops and non-crop environments.

Combinations and Mixtures

The present invention also provides a combination comprising:

(i) an amount of at least one dithiocarbamate fungicide,
(ii) an amount of at least one triazole fungicide, and
(iii) an amount of at least one pyrazole-carboxamide fungicide.

The present invention also provides a combination comprising:

(i) an amount of at least one dithiocarbamate fungicide,
(ii) an amount of at least one triazole fungicide, and
(iii) an amount of at least one pyrazole-carboxamide fungicide, wherein the combination is more effective in treating a plant or a locus against fungal infection than when each fungicide at the same amount is applied alone.

The present invention also provides a combination comprising:

(i) an amount of at least one dithiocarbamate fungicide,
(ii) an amount of at least one triazole fungicide, and
(iii) an amount of at least one pyrazole-carboxamide fungicide, wherein the amount of the dithiocarbamate fungicide, the amount of the triazole fungicide and the amount of the pyrazole-carboxamide fungicide when applied together is more effective in treating a plant or a locus against fungal infection than when each fungicide at the same amount is applied alone.

The present invention also provides a combination comprising:

(i) an amount of at least one dithiocarbamate fungicide,
(ii) an amount of at least one triazole fungicide, and
(iii) an amount of at least one pyrazole-carboxamide fungicide, wherein the amount of the dithiocarbamate fungicide is less than the fungicidally effective amount of the dithiocarbamate fungicide when the dithiocarbamate fungicide is used alone, wherein the amount of the triazole fungicide is less than the fungicidally effective amount of the triazole fungicide when the triazole fungicide is used alone, and/or wherein the amount of the pyrazole-carboxamide fungicide is less than the fungicidally effective amount of the pyrazole-carboxamide fungicide when the pyrazole-carboxamide fungicide is used alone.

In some embodiments, the combination comprises at least one agrochemically acceptable non-aqueous liquid carrier.

In some embodiments, the combination is a mixture.

In some embodiments, the combination is synergistic.

In some embodiments, the mixture is synergistic.

The combination or mixture may further comprise one or more of the components described hereinabove in connection with the fungicidal oil liquid composition.

The present invention also provides a fungicidal composition comprising any one of the combinations or mixtures disclosed herein.

In some embodiments, the fungicidal composition is a fungicidal oil liquid composition.

In some embodiments, the fungicidal composition is a fungicidal oil liquid formulation.

In some embodiments, the combination is diluted in water. In some embodiments, the mixture is diluted in water. In some embodiments, the fungicidal composition is diluted in water.

Methods of Use

The present invention also provides a method of treating a plant or a locus against fungal infection comprising applying an effective amount of any one of the combinations, mixtures or compositions disclosed herein to the plant or locus so as to thereby treat the plant or locus against fungal infection.

The present invention also provides a method of treating a plant or a locus against fungal infection comprising applying to the plant or locus:

(i) an amount of at least one dithiocarbamate fungicide,
(ii) an amount of at least one triazole fungicide, and
(iii) an amount of at least one pyrazole-carboxamide fungicide, so as to thereby treat the plant or locus against fungal infection.

The present invention also provides a method of treating a plant or a locus against fungal infection comprising applying to the plant or locus:

(i) an amount of at least one dithiocarbamate fungicide,
(ii) an amount of at least one triazole fungicide, and
(iii) an amount of at least one pyrazole-carboxamide fungicide, so as to thereby treat the plant or locus against fungal infection, wherein the amount of the dithiocarbamate fungicide, the amount of the triazole fungicide and the amount of the pyrazole-carboxamide fungicide when applied together is more effective for treating the plant or locus against fungal infection than when each fungicide at the same amount is applied alone.

The present invention also provides a method of treating a plant or a locus against fungal infection comprising applying to the plant or locus:

(i) an amount of at least one dithiocarbamate fungicide, (ii) an amount of at least one triazole fungicide, and (iii) an amount of at least one pyrazole-carboxamide fungicide, so as to thereby treat the plant or locus against fungal infection, wherein the amount of the dithiocarbamate fungicide applied is less than the fungicidally effective amount of the dithiocarbamate fungicide when the dithiocarbamate fungicide is used alone, wherein the amount of the triazole fungicide applied is less than the fungicidally effective amount of the triazole fungicide when the triazole fungicide is used alone, and/or wherein the amount of the pyrazole-carboxamide fungicide applied is less than the fungicidally effective amount of the pyrazole-carboxamide fungicide when the pyrazole-carboxamide fungicide is used alone.

In some embodiments, the method is effective for controlling fungal infection of the plant or locus.

In some embodiments, controlling fungal infection comprises controlling fungal disease infecting the plant or locus. In some embodiments, controlling fungal infection comprises controlling a plant or soil disease caused by phytopathologic fungi. In some embodiments, controlling fungal infection comprises controlling fungal attack on the plant or locus. In some embodiments, controlling fungal infection comprises reducing fungal infection of the plant or locus. In some embodiments, controlling fungal infection comprises curing a plant or soil disease caused by phytopathologic fungi.

In some embodiments, the method is effective for protecting the plant or locus against fungal infection.

In some embodiments, protecting the plant or locus against fungal infection comprises protecting the plant or locus against fungal attack. In some embodiments, protecting the plant or locus against fungal infection comprises protecting the plant or locus from fungal disease. In some embodiments, protecting the plant or locus against fungal infection comprises preventing fungal infection of the plant or locus.

In some embodiments, the method comprises applying an effective amount of any one of the combinations, mixtures, or compositions disclosed herein to propagation material of the plant. In some embodiment, the method comprises applying an effective amount of any one of the combinations, mixtures, or compositions disclosed herein to seed and/or seedling of the plant.

In some embodiments, the method comprises a protectant application of any one of the combinations, mixtures or compositions disclosed herein. In some embodiments, the method comprises a curative application of any one of the combinations, mixtures or compositions disclosed herein.

In some embodiments, the fungal attack is controlled by preventing fungal attack on the plant, seed or seedling. In some embodiments, the fungal attack is controlled by treating the fungal attack on the plant, seed or seedling.

In some embodiments, the fungicides are applied simultaneously.

In some embodiments, the fungicides are applied contemporaneously.

In some embodiments, the fungicides are applied sequentially.

In some embodiments, the fungicides are applied separately.

In some embodiments, the fungicides are applied together.

In some embodiments, the fungicides are applied together as a tank mix.

In some embodiments, the fungicides are applied in the form of any one of the combinations, mixtures or compositions disclosed herein.

In some embodiments, the amount of the dithiocarbamate fungicide, the amount of the triazole fungicide and the amount of the pyrazole-carboxamide fungicide when applied together in the form of any one of the compositions described herein is more effective for treating the plant or locus against fungal infection than when each fungicide at the same amount is applied in a form other than the compositions described herein.

In some embodiments, the amount of the dithiocarbamate fungicide, the amount of the triazole fungicide and the amount of the pyrazole-carboxamide fungicide when applied together in the form of any one of the compositions described herein is more effective for treating the plant or locus against fungal infection than when each fungicide at the same amount is applied in the form of a tank mix.

In some embodiments, the amount of the dithiocarbamate fungicide, the amount of the triazole fungicide and the amount of the pyrazole-carboxamide fungicide when applied together in the form of any one of the compositions described herein is more effective for treating the plant or locus against fungal infection than when each fungicide at the same amount is applied separately.

In some embodiments, the fungicides are applied to a portion of a plant, an area adjacent to a plant, soil in contact with a plant, soil adjacent to a plant, any surface adjacent to a plant, any surface in contact with a plant, a seed, and/or equipment used in agriculture. In some embodiments, the fungicides are applied to a locus of the plant, a locus in proximity to the plant, a locus of the fungi, or a locus in proximity to the fungi. In some embodiments, the fungicides are applied to soil in which the plant is grown. In some embodiments, the fungicides are applied to soil in which the plant is to be grown.

In some embodiments, the fungicides are applied at the time of planting.

In some embodiments, the fungicides are applied 1 to 60 day(s) after planting.

In some embodiments, the fungicides are applied 1 to 9 month(s) after planting.

In some embodiments, the fungicides are applied once during a growth season.

In some embodiments, the fungicides are applied at least one time during a growth season.

In some embodiments, the fungicides are applied two or more times during a growth season.

In some embodiments, the fungicides are applied three times during a growth season. In some embodiments, the applications are 15 days apart.

In some embodiments, the fungicides are applied as a soil application. In some embodiments, the fungicides are applied as a foliar application.

The combinations, mixtures and compositions described herein are suitable for the control of undesirable pests such as phytopathogenic fungi.

Effective application rates of the fungicidal composition cannot generally be defined, as it varies depending upon various conditions such as the type of pesticide, target pest, weather conditions, nature of the soil, and the type of crop. In some embodiments, the fungicidal composition is applied at a rate of about 1 to about 5 L/ha. In some embodiments, the fungicidal composition is applied at a rate of about 2 to 3 L/ha. In some embodiments, the fungicidal composition is applied at a rate of about 2 L/ha. In some embodiments, the fungicidal composition is applied at a rate of about 3 L/ha. In some embodiments, the fungicidal composition is applied at a rate of about 2.25 L/ha. In some embodiments, the fungicidal composition is applied at a rate of about 2.5 L/ha. In some embodiments, the fungicidal composition is applied at a rate of about 2.75 L/ha.

In some embodiments, the pyrazole-carboxamide fungicide is applied at a rate from about 10 g. a.i./ha to about 100 g. a.i./ha. In some embodiments, the pyrazole-carboxamide fungicide is applied at a rate from about 30 g. a.i./ha to about 80 g. a.i./ha. In some embodiments, the pyrazole-carboxamide fungicide is applied at a rate from about 50 g. a.i./ha to about 65 g. a.i./ha. In some embodiments, the pyrazole-carboxamide fungicide is applied at a rate of about 51 g. a.i./ha. In some embodiments, the pyrazole-carboxamide fungicide is applied at a rate of about 56 g. a.i./ha. In some embodiments, the pyrazole-carboxamide fungicide is applied at a rate of about 62 g. a.i./ha.

In some embodiments, the triazole fungicide is applied at a rate from about 10 g. a.i./ha to about 200 g. a.i./ha. In some embodiments, the triazole fungicide is applied at a rate from about 70 g. a.i./ha to about 130 g. a.i./ha. In some embodiments, the triazole fungicide is applied at a rate from about 50 g. a.i./ha to about 150 g. a.i./ha. In some embodiments, the triazole fungicide is applied at a rate from about 70 g. a.i./ha to about 90 g. a.i./ha. In some embodiments, the triazole fungicide is applied at a rate from about 100 g. a.i./ha to about 130 g. a.i./ha. In some embodiments, the triazole fungicide is applied at a rate of about 71 g. a.i./ha. In some embodiments, the triazole fungicide is applied at a rate of about 79 g. a.i./ha. In some embodiments, the triazole fungicide is applied at a rate of about 87 g. a.i./ha. In some embodiments, the triazole fungicide is applied at a rate of about 101 g. a.i./ha. In some embodiments, the triazole fungicide is applied at a rate of about 111 g. a.i./ha. In some embodiments, the triazole fungicide is applied at a rate of about 122 g. a.i./ha.

In some embodiments, the dithiocarbamate fungicide is applied at a rate from about 100 g. a.i./ha to about 2000 g. a.i./ha. In some embodiments, the dithiocarbamate fungicide is applied at a rate from about 500 g. a.i./ha to about 1500 g. a.i./ha. In some embodiments, the dithiocarbamate fungicide is applied at a rate from about 900 g. a.i./ha to about 1200 g. a.i./ha. In some embodiments, the dithiocarbamate fungicide is applied at a rate of about 990 g. a.i./ha. In some embodiments, the dithiocarbamate fungicide is applied at a rate of about 1100 g. a.i./ha. In some embodiments, the dithiocarbamate fungicide is applied at a rate of about 1210 g. a.i./ha.

In some embodiments, the dithiocarbamate fungicide is mancozeb.

In some embodiments, the triazole fungicide is prothioconazole. In some embodiments, the triazole fungicide is tebuconazole.

In some embodiments, the pyrazole-carboxamide fungicide is fluxapyroxad.

Methods of use include adding the fungicidal composition to a carrier such as water and using the resulting solution containing the fungicidal composition for spray applications to control phytopathogenic fungi in plant or propagation material thereof in crop or non-crop environments. By diluting the fungicidal composition in water, a suspoemulsion may be formed.

In some embodiments, the combination is diluted in water prior to application. In some embodiments, the mixture is diluted in water prior to application. In some embodiments, the composition is diluted in water prior to application.

In some embodiments, the fungicidal composition may be diluted in a carrier such as water in an amount of from about 1 to 100 L of the fungicidal composition per 1000 L of water. In some embodiments, the composition may be diluted in a carrier such as water in an amount of from about 1 to 30 L of the fungicidal composition per 1000 L of water. In some embodiments, the composition may be diluted in a carrier such as water in an amount of from about 5 to 15 L of the fungicidal composition per 1000 L of water.

The methods of the present subject matter may be applied to any crop plants, including but not limited to soybean, cereals, wheat corn, papaya, melon, cacao and coffee. In some embodiments, the plant is soybean plant. In some embodiments, the soybean plant is of the BONUS cultivar. In some embodiments, the soybean plant is of the M 5917 IPRO cultivar.

In some embodiments, the phytopathogenic fungi are one or more of the classes including but not limited to soybean rust (*Phakopsora pachyrhizi*), target spot (*Corynespora cassiicola*), late season diseases (*Septoria glycines* and *Cercospora kikuchii*), Northern leaf blight (*Exserohilum turcicum*), yellow leaf spot (*Dreshslera tritici-repentis*), Phaeosphaeria leaf spot (Phaeosphaeria *maydis*), Anthracnose (*Colletotrichum gloeosporioides*), Cereal smuts, Common smut (*Ustilago maydis*), Head smut (*Sphacelotheca reiliana*), False smut (*Ustilaginoidea vixens*), Flag smut (*Usrocystis agropyri*), Loose smut of wheat/barley (*Ustilago nuda*), Covered smut (*Ustilago segetum* var. *hordei*), and Semi-loose smut (*Ustilago avenae*). In some embodiments, the phytopathogenic fungi is soybean rust (*Phakopsora pachyrhizi*).

The combinations, mixtures and compositions described herein may be mixed with water and/or fertilizers and may be applied to a desired locus by any means, such as airplane spray tanks, knapsack spray tanks, cattle dipping vats, farm equipment used in ground spraying (e.g., boom sprayers, hand sprayers), and the like. The desired locus may be soil, plants, and the like.

The combinations, mixtures and compositions described herein may be applied to soybeans from vegetative growth stage V2 (Second trifoliolate—two sets of unfolded trifoliolate leaves) to reproductive growth stage R8 (Full maturity—95% of the pods have reached their full mature color).

The combinations, mixtures and compositions may include additional crop protection agents, for example insecticides, herbicides, fungicides, bactericides, nematicides, molluscicides, growth regulators, biological agents, fertilizers, or mixtures thereof. When used in combination with additional crop protection agents, the composition can be formulated with these co-agents, tank mixed with the co-agents or applied sequentially with the co-agents.

The present invention also provides use of any one of the combinations, mixtures or compositions disclosed herein for treating a plant or a locus against fungal infection.

The present invention also provides any one of the combinations, mixtures and compositions described herein for use in treating a plant or a locus against fungal infection.

The present invention also provides a package comprising any one of the combinations, mixtures or compositions disclosed herein.

Processes of Preparation

The present invention also provides a process for the preparation any one of the combinations, mixtures or compositions disclosed herein from individual component parts.

The present invention also provides a process for preparing any one of the fungicidal oil liquid compositions described herein comprising the steps of:

(i) dissolving at least one triazole fungicide and at least one pyrazole-carboxamide fungicide in at least one non-aqueous liquid carrier to obtain a solution;

(ii) adding at least one adjuvant, surfactant, anti-foaming agent and/or stabilizer to the solution of step (i) to obtain mixture; and (iii) adding at least one dithiocarbamate fungicide to the mixture of step (ii) so as to thereby obtain the fungicidal oil liquid composition.

In some embodiments, step (i) is performed under agitation. In some embodiments, step (i) is performed under agitation of 300-400 rpm.

In some embodiments, step (i) comprises heating the triazole fungicide, the pyrazole-carboxamide fungicide and the non-aqueous liquid carrier until a solution is obtained. In some embodiments, step (i) comprises heating the triazole fungicide, the pyrazole-carboxamide fungicide and the non-aqueous liquid carrier at 70° C. until a solution is obtained.

In some embodiments, step (ii) is performed while stirring.

In some embodiments, step (ii) is performed without heating the mixture.

In some embodiments, the process comprises cooling the mixture of step (ii) to a temperature of <35° C. prior to performing step (iii).

In some embodiments, step (iii) is performed under agitation. In some embodiments, step (iii) is performed under agitation of 1000 to 1500 rpm.

In some embodiments, the process further comprises a step of adjusting the viscosity of the composition by adding silica.

In some embodiments, the process further comprises filtering the fungicidal oil liquid composition of step (iii) prior to packaging.

In some embodiments, the fungicidal oil liquid composition of step (iii) is a homogeneous solution.

Each embodiment disclosed herein is contemplated as being applicable to each of the other disclosed embodiments. Thus, all combinations of the various elements described herein are within the scope of the invention. In addition, the elements recited in the composition embodiments can be used in the combination, mixture (including synergistic mixture), package, method and use embodiments described herein and vice versa.

The present invention is illustrated and further described in more detail with reference to the following non-limiting examples. The following examples illustrate the practice of the present subject matter in some of its embodiments but should not be construed as limiting the scope of the present subject matter. Other embodiments will be apparent to one skilled in the art from consideration of the specification and examples. It is intended that the specification, including the examples, is considered exemplary only without limiting the scope and spirit of the present subject matter.

EXPERIMENTAL EXAMPLES

Example 1: Mancozeb 440+Tebuconazole 44.5+Fluxapyroxad 22.5 OD Composition

The composition of Table 1 was made according to the following procedure:

In a tank with agitation (300-400 rpm), Solvesso™ 200, Hallcomid® M-10, 2-Ethyl Hexanol, fluxapyroxad and tebuconazole were added and heated at 70° C. until complete solubilization of the active ingredients. Then, heat was turned off and under stirring, Atlas Symperonic™ PE/F 68FL, Tween™ 24, antifoam, Rhodacal® 60/BE, tristyrylphenol 16 EO, methyl soyate and zinc oxide were added. The content of the tank was cooled until a temperature<35° C. was reached. Agitation was increased to between 1000 to 1500 rpm using agitator type Cowles and mancozeb was added. Viscosity was adjusted using silica. The content of the tank was cooled down to room temperature and filtered (100 mesh sieves) before packaging.

TABLE 1

Mancozeb 440 + Tebuconazole 44.5 + Fluxapyroxad 22.5 OD Composition for 1000 L

| Ingredient | CAS-No.: | Chemical Name | Function | Source | W/V [g/L] | w/w % |
|---|---|---|---|---|---|---|
| Mancozeb (as 100%) | 8018-01-7 | N-[2-[(dithiocarboxy)amino]ethyl]carbamodithioato(2-)-κS,κS']manganese mixt. With [N-[2-[(dithiocarboxy)amino]ethyl]carbamodithioato(2-)-κS,κS']zinc | a.i | Indofil; Sabero | 440.00 | 35.34 |
| Tebuconazole (as 100%) | 107534-96-3 | 1-(4-chlorophenyl)-4,4-dimethyl-3-(1,2,4-triazol-1-ylmethyl)pentan-3-ol | a.i | Adama | 44.50 | 3.57 |
| Fluxapyroxad (as 100%) | 907204-31-3 | 3-(Difluoromethyl)-1-methyl-N-(3',4',5'-trifluorobiphenyl-2-yl)pyrazole-4-carboxamide | a.i | BASF | 22.50 | 1.81 |
| Hallcomid ® M-10 | 14433-76-2 | N,N-dimethyl Decanamide | Co-solvent | Stepan | 35.00 | 2.81 |
| Tween ™ 24 (low moisture) | 9005-64-5 | Sorbitan Monolaurate Ethoxylated (*<1% moisture) | Surfactant | Croda | 150.00 | 12.05 |
| Surfom ® CE 1299 | 99734-09-05 | Tristyrylphenol 16 EO | Surfactant | Oxiteno | 21.00 | 1.69 |
| Rhodacal ® 60/BE | 26264-06-2 | Dodecylbenzene Sulfonate Calcium Salt | Surfactant | Solvay | 85.00 | 6.83 |

TABLE 1-continued

| Mancozeb 440 + Tebuconazole 44.5 + Fluxapyroxad 22.5 OD Composition for 1000 L | | | | | | |
|---|---|---|---|---|---|---|
| Ingredient | CAS-No.: | Chemical Name | Function | Source | W/V [g/L] | w/w % |
| Silcolapse ® 500 | 63148-62-9 | Polydimethylsiloxane | Antifoam | Elkem | 0.50 | 0.04 |
| Methylated Soybean Oil | 67784-80-9 | Methyl Ester of Soybean Oil | Co-solvent (Balance) | Cargill | 166.5 Up to 1000 L) | 13.37 |
| Solvent Naphtha Aromatic Heavy 200 | 64742-94-5 | Solvent Naphtha Aromatic Heavy 200 (<14% Naphthalene) | Solvent | Exxon Mobil | 140.00 | 11.24 |
| Symperonic ™ PE/F 68FL | 9003-11-6 | Ethylene Oxide/Propylene Oxide Block Copolymer | Surfactant | Croda | 20.00 | 1.61 |
| 2-Ethyl Hexanol | 104-76-7 | 2-Ethyl Hexanol | Co-solvent | Elekeiroz | 100.00 | 8.03 |
| Zinc Oxide | 1314-13-2 | Zinc Oxide | Stabilizer | Produquímica | 20.00 | 1.61 |
| Silica (Carb-o-Sil M5) | 112945-52-5 | Silica, filmed, Silica, Silicic anhydride, Silicon dioxide, Silicon dioxide amorphous; | Suspension aid | Cabot Corporation | 0 to 10 | 0 to 0.80 |

TABLE 2

| Specification of the Mancozeb 440 + Tebuconazole 44.5 + Fluxapyroxad 22.5 OD Composition | |
|---|---|
| Test | Specification |
| Appearance | Viscous Yellow Oily Liquid |
| Mancozeb concentration | 418-462 g/L |
| Fluxapyroxad concentration | 19.13-25.88 g/L |
| Tebuconazole concentration | 40.05-48.95 g/L |
| Density @20° C. g/cm3 | 1.245 |
| pH (1% sol) | 5.5-8.5 |

TABLE 3

| Stability Test Results of the Mancozeb 440 + Tebuconazole 44.5 + Fluxapyroxad 22.5 OD Composition | | | | | | | |
|---|---|---|---|---|---|---|---|
| | Normal Limits | Before storage | Sealed package After 2 week at 54° C. | Sealed package After 8 week at 40° C. | Sealed package After 3 month at Room | Sealed package After 6 month at Room | Sealed package After 2 weeks at 0° C. |
| Appearance | | matte yellow | matte yellow | | | matte yellow | |
| Mancozeb conc g/L: | 418-462 | 438.80 | 435.21 | 436.12 | 440.78 | 437.24 | |
| Tebuconazole g/L | 40.05-48.95 | 44.08 | 40.58 | 42.58 | 43.12 | 42.58 | |
| Fluxapyroxad g/L | 19.12-25.87 | 22.16 | 22.04 | 22.04 | 22.17 | 22.04 | |
| PH (%1) | 5.5-9.0 | 7.5 | 7.0 | 6.9 | 7.0 | 6.80 | |
| Persistent foam (2.5%) (Temp = 20° C.) | ≤60 ml after 1 min. | 0 ml | 0 ml | 0 ml | 0 ml | 0 ml | |
| WSR (10%, 75 μm) 15° C. | 2% w/w | 0.08% | 0.10% | 0.11% | 0.11% | | 0.12% |
| Dispersion stability. (hard water: 342 ppm) SOP NO: ADAMA/FOR/18 | | Sediment volume: 0.25 ml Top cream/oil: 0 ml | Sediment volume: 0.30 ml Top cream/oil: 0 ml | Sediment volume: 0.35 ml Top cream/oil: 0 ml | Sediment volume: 0.25 ml Top cream/oil: 0 ml | Sediment volume: 0.35 ml Top cream/oil: 0 ml | Sediment volume: 0.25ml Top cream/oil: 0 ml |
| Pourability and rinsed residue. | Pour. <5% Rinsed: <0.25% | 3.80% 0.18% | 3.95% 0.17% | 3.70% 0.15% | 3.97% 0.18% | 4.2% 0.19% | |
| Viscosity: (speed 6; Spindle 2) | 500-2500 cp | 850 | 880 | 880 | 840 | 1400 | |
| Density (SOP No: ADAMA/FOR/L/17) | 1.2300-1.2700 | 1.2501 | | | | 1.2462 | |
| PSD, D90, um | <20 | <9.34 | <10.12 | <12.4 | <12.33 | 12.42 | |
| Sedimentation (SOP No: ADAMA/ FOR/L/15_12C) | | | | | | 2 (A little sediment) | |
| Phase separation (SOP No: ADAMA/ FOR/L/15_12d) | | | | | | 5% oil separation | |

Example 2: Mancozeb 440+Prothioconazole 31.5+Fluxapyroxad 22.5 OD Composition The composition of Table 5 was made according to the following procedure:

In a tank with agitation, Solvesso™ 200, decanamide, fluxapyrodad, and prothioconazole were added and heated at 70° C. until complete solubilization of the active ingredients. Then, heat was turned off and under stirring, Atlas™ G-5002L-LQ-(CQ), tristyrylphenol 16 EO, Tween™ 24, antifoam, Rhodacal® 60/BE, methyl soyate and zinc oxide were added. The content of the tank was cooled down until a temperature of <35° C. was reached. Agitation was increased to between 1000 to 1500 rpm using agitator type Cowles and mancozeb was added. Viscosity was adjusted using silica. The content of the tank was cooled down to room temperature and filtered (100 mesh sieves) before packaging.

TABLE 4

Mancozeb 440 + Prothioconazole 31.5 + Fluxapyroxad 22.5 OD Composition for 1000 L

| Ingredient | CAS-No.: | Chemical Name | Function | Source | W/V [g/L] | w/w % |
|---|---|---|---|---|---|---|
| Mancozeb (as 100%) | 8018-01-7 | N-[2-[(dithiocarboxy)amino]ethyl]carbamodithioato(2-)-κS,κS']manganese mixt. With [N-[2-[(dithiocarboxy)amino]ethyl]carbamodithioato(2-)-κS,κS']zinc | a.i | Indofil; Sabero | 440.00 | 34.64 |
| Prothioconazole (as 100%) | 178928-70-6 | 2-[2-(1-chlorocyclopropyl)-3-(2-chlorophenyl)-2-hydroxypropyl]-2,4-dihydro-3H-1,2,4-triazole-3-thione | a.i | Adama MCW | 31.50 | 2.48 |
| Fluxapyroxad (as 100%) | 907204-31-3 | 3-(Difluoromethyl)-1-methyl-N-(3',4',5'-trifluorobiphenyl-2-yl)pyrazole-4-carboxamide | a.i | BASF | 22.50 | 1.77 |
| Hallcomid ® M-10 | 14433-76-2 | N,N-Dimethyl Decanamide | Co-solvent | Stepan | 40.00 | 3.15 |
| Surfom ® CE 1299 | 99734-09-05 | Tristyrylphenol Ethoxylated 16 EO | Surfactant | Oxiteno | 21.00 | 1.65 |
| Atlas ™ 5002 L LQ (CQ) | 9038-95-3 | EO/PO Block Copolymer | Surfactant | Croda | 4.50 | 0.35 |
| Tween ™ 24 (low moisture) | 9005-64-5 | Sorbitan Monolaurate Ethoxylated (*<1% moisture) | Surfactant | Croda | 150.00 | 11.81 |
| Rhodacal ® 60/BE | 26264-06-2 | Dodecylbenzenesulfonate Calcium Salt | Surfactant | Solvay | 85.00 | 6.69 |
| Silcolapse ® 500 | 63148-62-9 | Polydimethylsiloxane | Antifoam | Elkem | 0.50 | 0.04 |
| Methylated soybean Oil | 67784-80-9 | Methyl Ester of Soybean Oil | Co-solvent (Balance) | Cargill | 305 (Up to 1000 L) | 24.04 (Up to 100%) (or 23.78 (Up to 100%)) |
| Solvent Naphtha aromatic heavy 200 (Solvesso ™ 200) | 64742-94-5 | Solvent Naphtha Aromatic Heavy 200 (<14% Naphthalene) | Solvent | Exxon Mobil | 150.00 | 11.81 |
| Zinc Oxide | 1314-13-2 | Zinc Oxide | Stabilizer | Produquímica | 20.00 | 1.57 |
| Silica (Carb-o-Sil M5) | 112945-52-5 | Silica, fumed, Silica, Silicic anhydride, Silicon dioxide, Silicon dioxide amorphous; | Suspension aid | Cabot Corporation | 0 to 10 | 0 to 0.79 (or 0 to 1.58) |

TABLE 5

Specification of the Mancozeb 440 + Prothioconazole 31.5 + Fluxapyroxad 22.5 OD Composition

| Test | Specification |
|---|---|
| Appearance | Viscous Yellow Oily Liquid |
| Mancozeb concentration | 418-462 g/L |
| Fluxapyroxad concentration | 19.13-25.88 g/L |
| Prothioconazole concentration | 28.35-34.65 g/L |
| Density @20° C. g/cm3 | 1.270 |
| pH (1% water) | 5.5-8.5 |

TABLE 6

Stability Test Results of Mancozeb 440 + Prothioconazole 31.5 + Fluxapyroxad 22.5 OD Composition

| P005/2018 | Normal Limits | Before storage | Sealed package After 2 week at 54° C. | Sealed package After 8 week at 40° C. | Sealed package After 3 month at Room | Sealed package After 6 month at Room | Sealed package After 2 weeks at 0° C. |
|---|---|---|---|---|---|---|---|
| Appearance | | matte yellow | matte yellow | matte yellow | matte yellow | matte yellow | |
| Mancozeb conc g/L: | 396-484 | 465.76 | 452.05 | 463.75 | 448.10 | 445.41 | |
| Prothioconazole g/L | 28.35-34.65 | 32.25 | 31.65 | 31.11 | 31.24 | 31.08 | |
| Fluxapyroxad g/L | 19.12-25.87 | 23.25 | 23.94 | 23.26 | 22.82 | 23.15 | |
| PH (%1) | 5.0-9.0 | 7.3 | 7.1 | 6.8 | 6.8 | 7.0 | 6.8 |
| Dispersion stability. (hard water: 342 ppm) SOP NO: ADAMA/FOR/18 | | Sediment volume: 0.15ml Top cream/oil 0 ml | Sediment volume: 0.18 ml Top cream/oil: 0 ml | | Sediment volume: 0.19 ml Top cream/oil: 0 ml | Sediment volume: 0.23 ml Top cream/oil: 0 ml | Sediment volume: 0.21 ml Top cream/oil: 0 ml |
| Persistent foam | ≤60 ml | 0 ml | 0 ml | 0 ml | 0 ml | 0 ml | |

TABLE 6-continued

Stability Test Results of Mancozeb 440 + Prothioconazole 31.5 + Fluxapyroxad 22.5 OD Composition

| P005/2018 | Normal Limits | Before storage | Sealed package After 2 week at 54° C. | Sealed package After 8 week at 40° C. | Sealed package After 3 month at Room | Sealed package After 6 month at Room | Sealed package After 2 weeks at 0° C. |
|---|---|---|---|---|---|---|---|
| (2.5%) (Temp = 20° C.) | after 1 min. | | | | | | |
| WSR (10%, 75 μm) 15° C. | 2% w/w | 0.07% | 0.15% | 0.09% | 0.10% | 0.15 | 0.07 |
| Pourability and rinsed residue. | Pour. <5% Rinsed: <0.25% | 3.17% 0.15% | 3.45% 0.17% | 3.45% 0.15% | 3.15% 0.12% | 3.98% 0.17% | |
| Viscosity: (speed 6; Spindle 2) | 500-2000 cp | 900 | 950 | 950 | 900 | 1300 | 910 |
| Density (SOP No: ADAMA/FOR/L/17) | 1.2500-1.2800 | 1.2698 | | | | 1.2629 | |
| PSD, D90, um | <20 | 10.78 | 10.95 | 10.18 | 10.2 | 11.41 | 10.55 |
| Sedimentation (SOP No: ADAMA/FOR/L/15_12C) | | | | | | 2-3 (A little sediment but viscous) | |
| Phase separation (SOP No: ADAMA/FOR/L/15_12d) | | | | | | 9% oil separation | |

Example 3: Efficacy Study

The objective of this experiment was to evaluate the efficacy of the pre-mix compositions of Examples 1 and 2 in comparison with tank mixes of the same agents and the three-way pre-mix composition of tebuconazole, picoxystrobin and mancozeb described in PCT International Application Publication No. WO 2017/203527 A1.

The pre-mix compositions and tank-mixes used are summarized in Table 7 below.

TABLE 7

| Active Ingredients | Type | g.a.i./ha | Rate (mL or g/ha) |
|---|---|---|---|
| Untreated | — | — | — |
| Fluxapyroxad + Prothioconazole + Mancozeb | (22.5 + 31.5 + 440) OD (Pre-mixed composition of Table 4) | 50.62 + 70.87 + 990 | 2250 |
| Fluxapyroxad + Prothioconazole + Mancozeb | (22.5 + 31.5 + 440) OD (Pre-mixed composition of Table 4) | 56.25 + 78.75 + 1100 | 2500 |
| Fluxapyroxad + Prothioconazole + Mancozeb | (22.5 + 31.5 + 440) OD (Pre-mixed composition of Table 4) | 61.87 + 86.62 + 1210 | 2750 |
| Fluxapyroxad + Prothioconazole + Mancozeb | 300SC + 250EC + 750WG (Tank mix) | 50.62 + 70.87 + 990 | 168 + 283 + 1320 |
| Fluxapyroxad + Tebuconazle + Mancozeb | (22.5 + 44.5 + 440) OD (Pre-mixed composition of Table 1) | 50.62 + 101.15 + 990 | 2250 |
| Fluxapyroxad + Tebuconazle + Mancozeb | (22.5 + 44.5 + 440) OD (Pre-mixed composition of Table 1) | 56.25 + 111.25 + 1100 | 2500 |
| Fluxapyroxad + Tebuconazle + Mancozeb | (22.5 + 44.5 + 440) OD (Pre-mixed composition of Table 1) | 61.87 + 122.37 + 1210 | 2750 |
| Fluxapyroxad + Tebuconazle + Mancozeb | 300SC + 200EC + 750WG (Tank mix) | 50.62 + 101.15 + 990 | 168 + 505 + 1320 |
| Tebuconazole + Picoxystrobin + Mancozeb | (26.66 + 33.33 + 400) OD (Pre-mixed composition) | 75 + 60 + 900 | 2250 |

Each pre-mixture or tank mix was sprayed at the indicated rate three times 15 days apart starting at the beginning of flowering on soybean plant affected by *Phakopsora pachyrhizi*.

Figure 2:
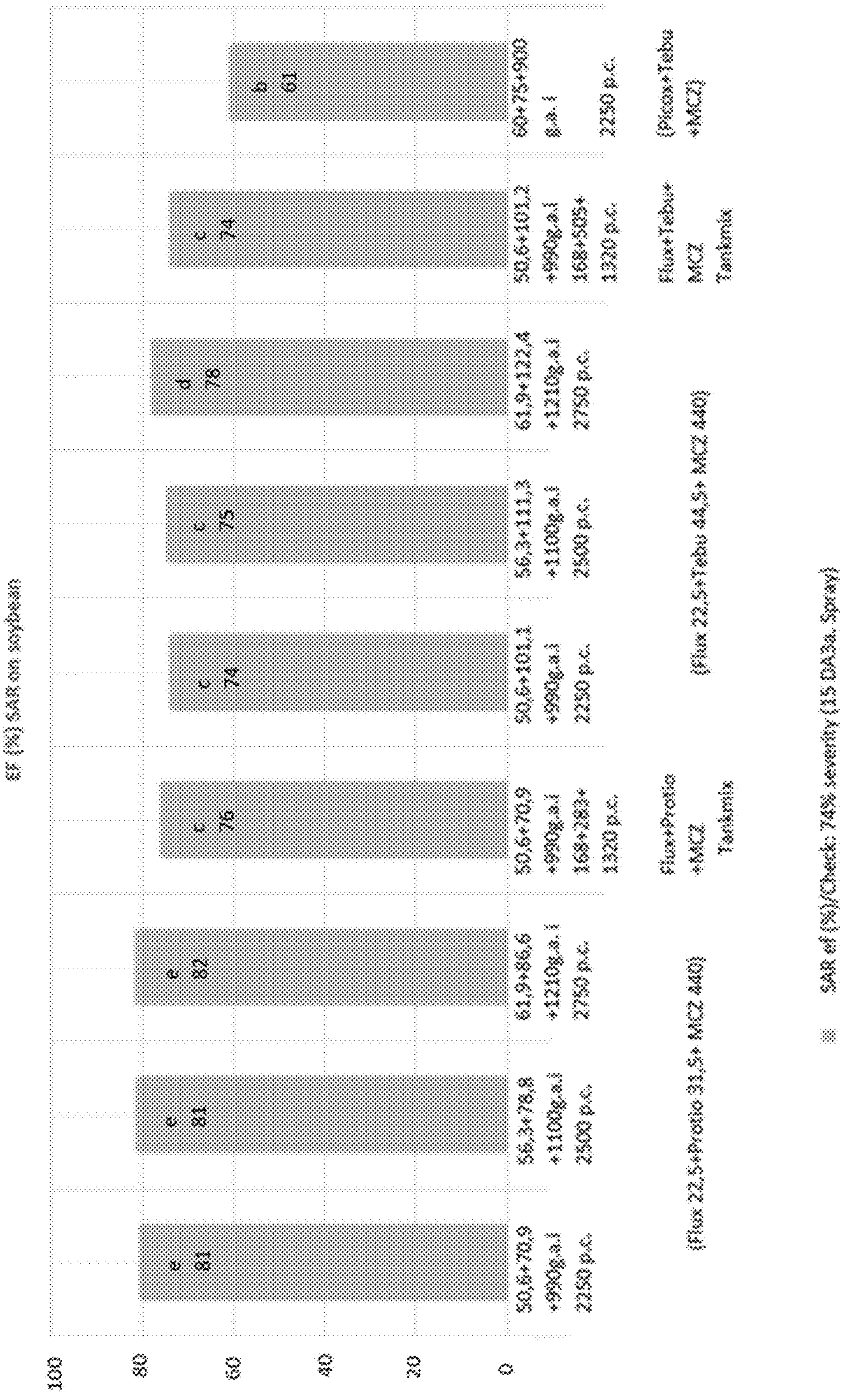
FIG. 2 shows the efficacy of the pre-mix compositions of Examples 1 and 2 in comparison with tank mixes of the same agents and a three-way pre-mix composition of tebuconazole, picoxystrobin and mancozeb (commercial standard) for controlling *Phakopsora pachyrhizi* affecting soybean plants of the M 5917 IPRO cultivar (study conducted in Ponta Grossa-PR/Brazil).
Figure 3:
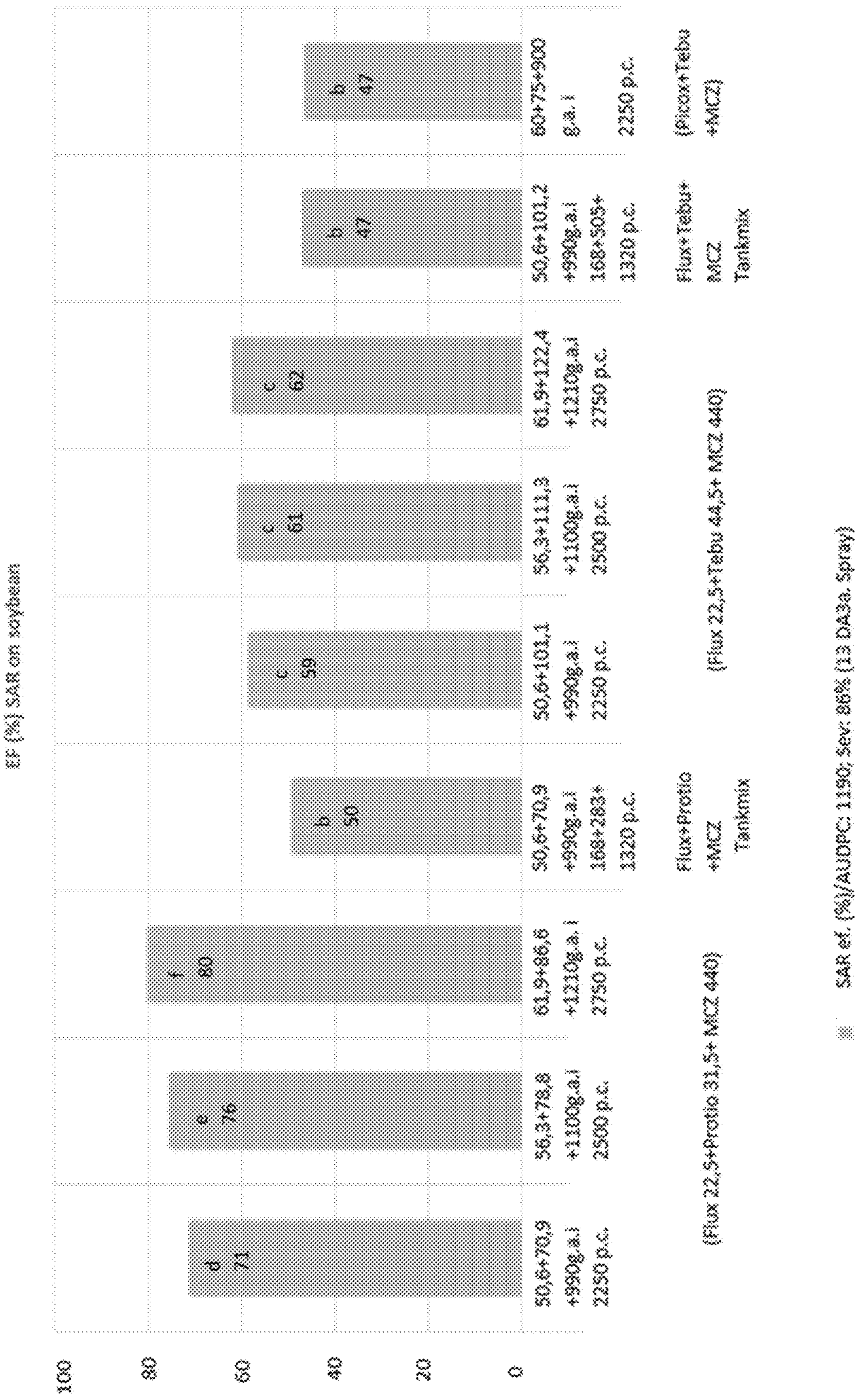
FIG. 3 shows the efficacy of the pre-mix compositions of Examples 1 and 2 in comparison with tank mixes of the same agents and a three-way pre-mix composition of tebuconazole, picoxystrobin and mancozeb (commercial standard) for controlling *Phakopsora pachyrhizi* affecting soybean plants of the BONUS cultivar (study conducted in Rio verde-GO/Brazil).

FIG. 1 shows the results of the above study conducted in Uberlandia-MG/Brazil using soybean plants of the BONUS cultivar. FIG. 2 shows the results of the above study conducted in Ponta Grossa-PR/Brazil using soybean plants of the M 5917 IPRO cultivar. FIG. 3 shows the results of the above study conducted in Rio verde-GO/Brazil using soybean plants of the BONUS cultivar.

FIGS. 1-3 show that the pre-mix composition of fluxapyroxad, prothioconazole and mancozeb (Table 4) was more effective at controlling *Phakopsora pachyrhizi* than tank mixes of the same three active ingredients when applied at the same rate.

FIGS. 1 and 3 show that the pre-mix composition of fluxapyroxad, tebuconazole and mancozeb (Table 1) was more effective at controlling *Phakopsora pachyrhizi* than tank mixes of the same three active ingredients when applied at the same rate.

FIGS. 1-3 show that the pre-mix composition of fluxapyroxad, prothioconazole and mancozeb (Table 4) was more effective at controlling *Phakopsora pachyrhizi* than the pre-mix composition of tebuconazole, picoxystrobin and mancozeb (commercial standard).

FIGS. 1-3 show that the pre-mix composition of fluxapyroxad, tebuconazole and mancozeb (Table 1) was more effective at controlling *Phakopsora pachyrhizi* than the pre-mix composition of tebuconazole, picoxystrobin and mancozeb (commercial standard).

What is claimed is:

1. A fungicidal oil liquid composition comprising:
(i) at least one dithiocarbamate fungicide,
(ii) at least one triazole fungicide,
(iii) at least one pyrazole-carboxamide fungicide, and
(iv) at least one agrochemically acceptable non-aqueous liquid carrier,
wherein the dithiocarbamate fungicide is suspended in the liquid carrier and the triazole fungicide and the pyrazole-carboxamide fungicide are dissolved in the liquid carrier.

2. The composition of claim 1, wherein:
a) the dithiocarbamate fungicide is selected from the group consisting of mancozeb, maneb, metiram, propineb, thiram, zinc thiazole, zineb and ziram,
b) the triazole fungicide is selected from the group consisting of azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, penconazole, propiconazole, simeconazole, tebuconazole, tetraconazole, triadimefon, triadimenol, triticonazole and prothioconazole, and/or
c) the pyrazole-carboxamide fungicide is selected from the group consisting of benzovindiflupyr, bixafen, fluxapyroxad, furametpyr, isopyrazam, penflufen, penthiopyrad and sedaxane.

3. The composition of claim 1, wherein the dithiocarbamate fungicide is mancozeb, the triazole fungicide is prothioconazole, and/or the pyrazole-carboxamide fungicide is fluxapyroxad.

4. The composition of claim 1, wherein:
a) the amount of the dithiocarbamate fungicide is about 0.1-80 wt. % based on the total weight of the composition,
b) the amount of the triazole fungicide is about 0.1-15 wt. % based on the total weight of the composition,
c) the amount of the pyrazole-carboxamide fungicide is about 0.1-10 wt. % based on the total weight of the composition,
d) the amount of the dithiocarbamate fungicide in the composition is about 400-500 g/L,
e) the amount of the triazole fungicide in the composition is about 20-60 g/L, and/or
f) the amount of the pyrazole-carboxamide fungicide in the composition is about 15-30 g/L.

5. The composition of claim 1, wherein:
a) the non-aqueous liquid carrier is selected from the group consisting of aromatic hydrocarbons, paraffins, petroleum, alcohols, ketones, vegetable oil, alkyl ester of vegetable oils, diesel, mineral oil, alkyl amides, fatty acid amides, fatty acids, tall oil fatty acids, alkyl esters of fatty acids, modified vegetable oils and any combination thereof, and/or
b) the total amount of non-aqueous liquid carrier in the composition is about 0.1-80 wt. % based on the total weight of the composition.

6. The composition of claim 1, wherein:
a) the non-aqueous liquid carrier is a combination of an aromatic hydrocarbon, an alkyl amide, and an alkyl ester of vegetable oil,
b) the non-aqueous liquid carrier is a combination of solvent naphtha aromatic heavy 200, N,N-dimethyl decanamide, and methyl ester of soybean oil,
c) the non-aqueous liquid carrier is a combination of an aromatic hydrocarbon, an alkyl amide, an alkyl ester of vegetable oil and an alcohol, or
d) the non-aqueous liquid carrier is a combination of solvent naphtha aromatic heavy 200, N,N-dimethyl decanamide, methyl ester of soybean oil and 2-ethyl hexanol.

7. The composition of claim 1, wherein the composition comprises at least one adjuvant, surfactant, adhesive, neutralizer, thickener, binder, sequestrate, biocide, stabilizer, suspension aid, buffer, preservative, antioxidant, anti-foaming agent and/or anti-freeze agent.

8. The composition of claim 1, wherein:
a) the composition comprises at least one adjuvant and the adjuvant is polyoxyethylene (16) sorbitan monolaurate, and/or
b) the composition comprises at least one surfactant and the surfactant is selected from the group consisting of tristyrylphenol ethoxylates, alkyl benzene sulfonates and salts thereof, ethylene oxide-propylene oxide block copolymers and any combination thereof.

9. The composition of claim 1, wherein the composition comprises three surfactants and the surfactants are tristyrylphenol ethoxylated 16 EO, docecylbenzene sulfonate calcium salt and an ethylene oxide-propylene oxide block copolymer.

10. The composition according to claim 4, characterized in that it comprises an anti-foaming agent, a stabilizer and/or a suspension aid, wherein:
the anti-foaming agent is polydimethylsiloxane,
the stabilizer is zinc oxide, and/or
the suspension aid is silica, fumed silica, silicic anhydride, silicon dioxide, and/or silicon dioxide amorphous.

11. A method of treating a plant or a locus thereof against fungal infection comprising applying an effective amount the composition of claim 1 to the plant or locus so as to thereby treat the plant or locus against fungal infection.

12. The method of claim 11, wherein:

a) the pyrazole-carboxamide fungicide is applied at a rate from about 10 g. a.i./ha to about 100 g. a.i./ha, b) the triazole fungicide is applied at a rate from about 10 g. a.i./ha to about 200 g. a.i./ha, and/or c) the dithiocarbamate fungicide is applied at a rate from about 100 g. a.i./ha to about 2000 g. a.i./ha.

13. A package comprising the composition of claim 1.

14. A process for the preparation the composition of claim 1 from individual component parts wherein the process comprises the steps of:

(i) dissolving at least one triazole fungicide and at least one pyrazole-carboxamide fungicide in at least one non-aqueous liquid carrier to obtain a solution; and (ii) adding at least one dithiocarbamate fungicide to the solution of step (i) to obtain mixture; so as to thereby obtain the fungicidal oil liquid composition.

15. A process for preparing the composition of claim 1 wherein the composition comprises at least one adjuvant, surfactant, anti-foaming agent and/or stabilizer, and wherein the process comprises the steps of:

(i) dissolving at least one triazole fungicide and at least one pyrazole-carboxamide fungicide in at least one non-aqueous liquid carrier to obtain a solution;

(ii) adding at least one adjuvant, surfactant, anti-foaming agent and/or stabilizer to the solution of step (i) to obtain mixture; and (iii) adding at least one dithiocarbamate fungicide to the mixture of step (ii) so as to thereby obtain the fungicidal oil liquid composition.

* * * * *